US011036348B2

(12) United States Patent
Jain et al.

(10) Patent No.: US 11,036,348 B2
(45) Date of Patent: Jun. 15, 2021

(54) USER INTERACTION DETERMINATION WITHIN A WEBINAR SYSTEM

(71) Applicant: Adobe Inc., San Jose, CA (US)

(72) Inventors: Ajay Jain, Ghaziabad (IN); Sanjeev Tagra, Panipat (IN); Sachin Soni, New Delhi (IN); Eric Andrew Kienle, Portland, OR (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/519,796

(22) Filed: Jul. 23, 2019

(65) Prior Publication Data

US 2021/0026500 A1 Jan. 28, 2021

(51) Int. Cl.
*G06F 3/0481* (2013.01)
*G06Q 30/02* (2012.01)
*H04L 29/08* (2006.01)

(52) U.S. Cl.
CPC ....... *G06F 3/0481* (2013.01); *G06Q 30/0245* (2013.01); *H04L 67/02* (2013.01)

(58) Field of Classification Search
CPC .... G06F 3/0481; G06Q 30/0245; H04L 67/02
See application file for complete search history.

(56) References Cited

U.S. PATENT DOCUMENTS

| 8,639,704 | B2 | 1/2014 | Yerli | |
|---|---|---|---|---|
| 9,426,421 | B2* | 8/2016 | Balasaygun | ........ H04L 12/1813 |
| 10,204,166 | B2 | 2/2019 | Petrescu et al. | |
| 10,459,985 | B2 | 10/2019 | Shepherd et al. | |
| 10,617,362 | B2 | 4/2020 | Bastide et al. | |
| 10,855,785 | B2 | 12/2020 | Jain et al. | |
| 2012/0023457 | A1* | 1/2012 | Lai | ...................... G06Q 30/0251 715/863 |
| 2012/0203639 | A1* | 8/2012 | Webster | ............. G06Q 30/0269 705/14.66 |
| 2013/0290434 | A1* | 10/2013 | Bank | ...................... G06Q 10/10 709/206 |
| 2013/0339875 | A1* | 12/2013 | Sahai | .................. H04L 12/1827 715/753 |

(Continued)

OTHER PUBLICATIONS

"How to Host A Webinar That Will Generate Leads for Your Business", Retrieved at: https://resources.mojomedialabs.com/blog/how-to-host-a-webinar-that-will-generate-leads-for-your-business, Feb. 18, 2017, 6 pages.

(Continued)

*Primary Examiner* — Dino Kujundzic
(74) *Attorney, Agent, or Firm* — FIG. 1 Patents

(57) ABSTRACT

In implementations of user interaction determination within a webinar system, a computing device implements a webinar system that exposes interactive elements on user devices during a webinar and monitors device interactions reflecting user interactions with webinar content on the user devices. The webinar system determines amounts of user interaction based on the device interactions, and can output the interactive elements based on the device interactions. The webinar system can receive user responses to the interactive elements, and maintain a pipeline that assigns levels to the users based on the user responses and the interactive elements. Users are determined as sales leads based on the levels for the users in the pipeline.

20 Claims, 9 Drawing Sheets

(56) References Cited

U.S. PATENT DOCUMENTS

| | | | |
|---|---|---|---|
| 2014/0127656 A1* | 5/2014 | Healy | G09B 5/00 |
| | | | 434/236 |
| 2014/0278746 A1* | 9/2014 | Kolowich | G06Q 30/0201 |
| | | | 705/7.29 |
| 2015/0249716 A1 | 9/2015 | Chen et al. | |
| 2016/0259840 A1* | 9/2016 | Zheng | G06F 40/14 |
| 2016/0261655 A1* | 9/2016 | Aggarwal | H04L 65/4053 |
| 2016/0344779 A1* | 11/2016 | Jain | H04L 65/403 |
| 2017/0223066 A1 | 8/2017 | Grevers | |
| 2019/0362317 A1 | 11/2019 | Rogynskyy et al. | |
| 2020/0153915 A1 | 5/2020 | Jain et al. | |
| 2020/0313919 A1* | 10/2020 | Gurr | H04L 12/1831 |

OTHER PUBLICATIONS

"How to Use Webinars Effectively to Generate 1,000's of Leads", Retrieved at: https://warren-knight.com/2017/04/06/how-to-use-webinars-effectively-generate-1000s-leads/, Apr. 6, 2017, 8 pages.

"Webinars, the No. 1 tool for lead generation", Retrieved at: https://www.webinar.nl/en/news/webinars-the-number-1-tool-for-lead-generation/, Mar. 22, 2018, 2 pages.

Bullock,"Why you need to add webinars to your content marketing strategy", Retrieved at: https://www.wordtracker.com/blog/marketing/why-you-need-to-add-webinars-to-your-content-marketing-strategy, May 30, 2018, 16 pages.

Davidson,"Webinar Marketing Makes an Impact on Lead Generation", Retrieved at: https://www.conferencecalling.com/blog/webinars-for-lead-generation, May 10, 2016, 4 pages.

DiScipio,"Why You Should Use Webinars to Generate Leads (& Who's Doing it Right)", Retrieved at: https://www.impactbnd.com/blog/use-webinars-to-generate-leads—on Jun. 5, 2019, Oct. 28, 2015, 13 pages.

Gardner,"10 Reasons Smart Companies Use Webinars for Lead Gen [Infographic]", Retrieved at: https://unbounce.com/lead-generation/smart-companies-use-webinars/, Jan. 17, 2013, 7 pages.

Howes,"5 Ways to Generate Leads for Webinars", Retrieved at: https://diythemes.com/thesis/webinar-lead-generation/—on Jun. 5, 2019, 5 pages.

Jain,"How to Generate Leads from Webinars", https://aeroleads.com/blog/generate-leads-via-webinars/, Feb. 12, 2019, 10 pages.

McDuffee,"Webinars are the Best Way to Generate Leads", Retrieved at: https://www.mmmatters.com/blog/best-way-to-generate-leads, Feb. 2, 2019, 7 pages.

Talreja,"10 Tips for Generating Business Leads with Free Webinars", Retrieved at: https://www.sitepoint.com/10-tips-for-generating-business-leads-with-free-webinars/, Dec. 1, 2016, 3 pages.

Zomick,"How to Generate Leads with Webinars", Retrieved at: https://blog.marketo.com/2018/01/generate-leads-webinars.html—on Jun. 5, 2019, 10 pages.

"First Action Interview Office Action", U.S. Appl. No. 16/185,925, dated Mar. 5, 2020, 4 pages.

"Pre-Interview First Office Action", U.S. Appl. No. 16/185,925, dated Jan. 13, 2020, 6 pages.

"Notice of Allowance", U.S. Appl. No. 16/185,925, dated Jul. 28, 2020, 9 pages.

* cited by examiner

USER INTERACTION DETERMINATION WITHIN A WEBINAR SYSTEM

BACKGROUND

Webinar systems are web-based, video and/or voice conferencing systems that allow an audience of users to view content of a webinar, such as a slide presentation, video, chalkboard, listen to a presentation, and so forth. Webinar systems may provide content as part of the webinar in a live fashion in which a host (e.g., an administrator, teacher, or presenter) is connected over a network to the users of the webinar, who may ask questions to the host in real time. Webinar systems may also provide content as part of the webinar in an on-demand fashion, in which pre-recorded content is broadcast from a server computing device to a user device of a user of the webinar at the convenience of the user.

Webinars hosted by a webinar system may include tens, hundreds, and in some cases even thousands of participants. Conventional webinar systems, however, are unable to support a variety of insights that may be gained due to limitations of these systems in obtaining information about users that participate in the webinar. For instance, conventional webinar systems are limited to a list of attendees of the webinar. Therefore, conventional webinar systems that rely on such a list to support other functionality, such as to generate sales leads, may fail for their intended purpose. For example, some users may simply participate in a webinar for educational purposes, and have no intent on purchasing products or services related to the webinar. Therefore, these users represent poor sales leads that are "dead ends" that result in inefficient use of resources of a digital marketing system to pursue these dead ends, such as by contacting the users via phone, email, advertisement, and so forth, and thus results in inefficient use of both computational and network resources and inefficient user interaction.

SUMMARY

Webinar user interaction determination techniques and systems are described. A computing device, such as a server computing device implemented in a cloud-based system in one example, implements a webinar system that receives data from user devices to monitor user interactions with content communicated within the webinar. This may be used to support a wide variety of functionality, such as to determine which interactive elements (e.g., surveys) are to be output as part of content of the webinar to user devices (e.g., based on amounts of user interaction) and also which users of the user devices are potential sales leads based on responses received via the interactive elements as part of the webinar.

In one example, an administrator (e.g., an author of the webinar) defines the interactive elements to be exposed on user devices as part of the webinar, and provides the interactive elements to the webinar system. Additionally or alternatively, the webinar system may generate the interactive elements automatically during the webinar, such as based on content of the webinar or a user's response to a previously-exposed interactive element. The webinar system may cause display of the interactive elements on the user devices at any suitable time during the webinar, such as based on an elapsed amount of time, an amount of webinar content exposed (e.g., every three slides), a user's engagement level in the webinar, and the like.

The webinar system, for instance, may be configured to maintain a pipeline of the interactive elements presented to each user via the user's computing device, and assign levels in the pipeline to the users based on the user responses and the interactive elements. For example, the pipeline may indicate a level for a user based on the number of responses to interactive elements provided by the user, so that a first user who responds more than a second user is assigned a higher level in the pipeline than the second user. The webinar system then determines users of the webinar as sales leads, automatically and without user intervention, based on the levels for the users in the pipeline, such as by selecting the users having levels in the pipeline greater than a level depth threshold.

Accordingly, the webinar system identifies sales leads as users of the webinar who demonstrate an interest in the webinar based on their responses to the interactive elements, rather than simply based on attendance in the webinar as limited by conventional webinar systems, and is thus more efficient than conventional webinar systems. Hence, the webinar system identifies high-quality sales leads who have a high likelihood of purchasing a product of the webinar, and may do so for a multitude of participants in real time, which is not possible by a human user of conventional webinar systems.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
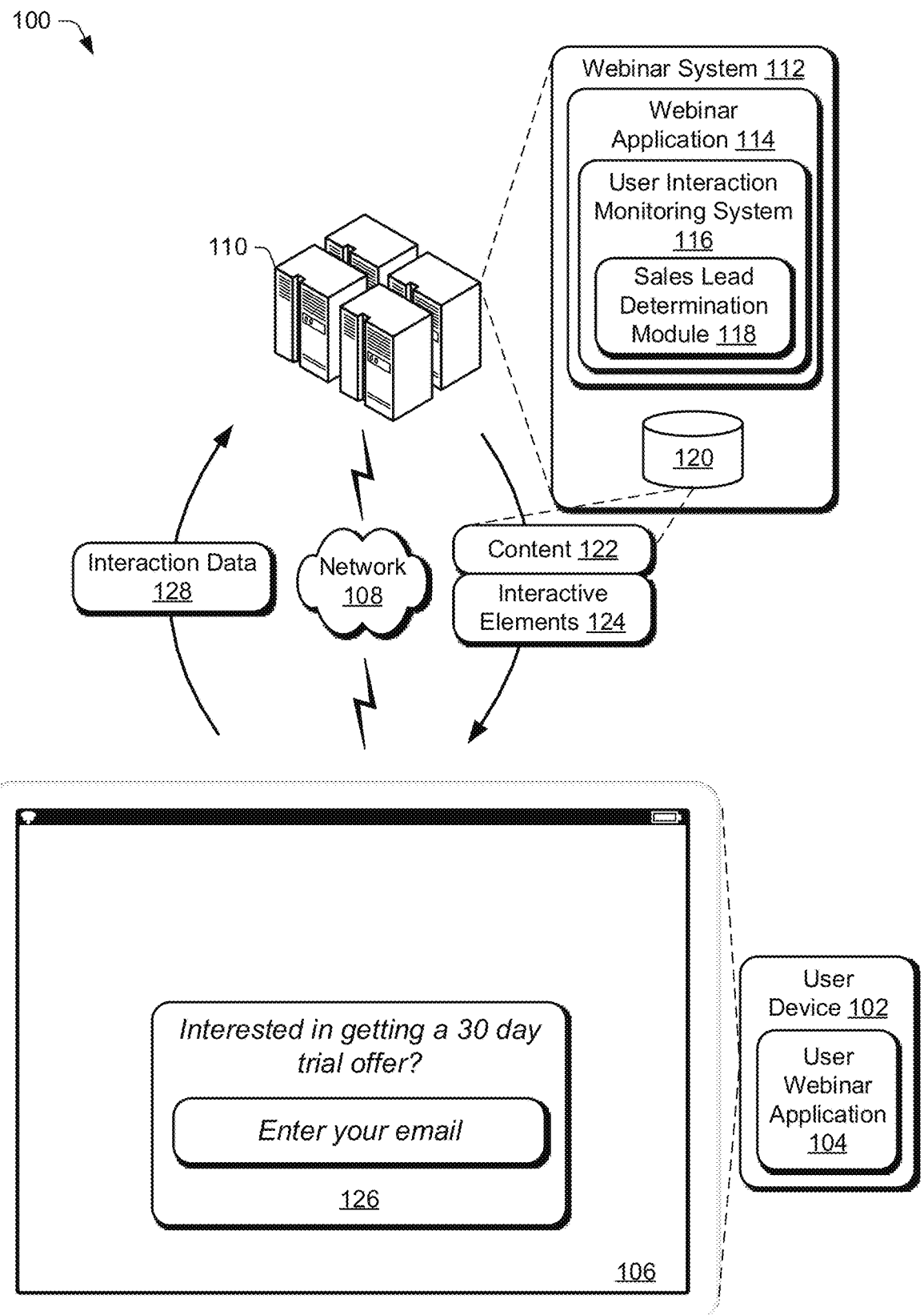
FIG. 1 illustrates a digital medium environment in an example implementation that is operable to employ techniques described herein.

Webinar systems may be used to provide a wide variety of content as part of a webinar to a wide range of user devices disposed across a wide range of geographic locations. The webinar, for instance, may include content such as a slide presentation, audio, or video, and provide the content to the users of the user devices over the Internet. A webinar may be live (e.g., the users of the webinar may communicate with a host of the webinar in real time during the webinar), or on-demand (e.g., the webinar system may provide pre-recorded webinar content to users at any suitable time for the users). As previously described, conventional webinar systems support limited functionality regarding information that may be learned from users participating in the webinar. As such, conventional webinar systems are unable to track user interaction with content of the webinar in real time (which is not possible by a human user), and may miss valuable insights gained from this monitored user interaction. This problem may be further exacerbated by the tens, hundreds, and even thousands of users that may participate in a webinar via respective user devices using a multitude of different interactive elements.

Accordingly, systems, devices, and techniques are described for monitoring user interaction as part of a webinar. This functionality may be used to support a variety of functionalities. In one example, this functionality is used to determine sales leads within a webinar to control output of content (e.g., digital marketing content such as advertisements), interactive elements, and so on to user devices of users who participate in the webinar. The webinar system, for instance, may receive data that is generated based on monitored user interaction, such as user responses to interactive elements exposed during the webinar. From this data, the webinar system may gain an ability to distinguish users of the webinar who are likely to purchase a product from users of the webinar who are not likely to purchase a product. This ability is simply not possible with conventional webinar systems that rely solely on a list of attendees to determine sales leads, nor is it possible to be performed by a human user in real time when confronted by the tens, hundreds, and even thousands of users that may interact with a multitude of different interactive elements as part of the webinar.

The webinar system, for instance, may expose interactive elements during a webinar on user devices as part of the webinar. Examples of interactive elements include a question, a poll, a chat, an offer, a reward, combinations thereof, and the like. In one example, an administrator (e.g., an author or presenter of the webinar) defines the interactive elements to be exposed during the webinar, and provides the interactive elements to the webinar system to control exposure of these elements. For instance, the interactive elements may be pre-determined by the administrator prior to the webinar being viewed by users.

Additionally or alternatively, the webinar system may generate the interactive elements during the webinar, e.g., based on content of the webinar. For instance, the webinar may include content (e.g., a slide) regarding a type of automobile. From this, the webinar system generates a question for users of the webinar based on the type of automobile in the slide, such as "Would you like to see the specification sheet for this car?" Additionally or alternatively, the webinar system may generate the interactive elements during the webinar based on a user's previously-received response, such as to a previously-exposed interactive element. For instance, the user may enter a vote in a poll via a respective user device indicating the user prefers Italian sports cars over German sports cars. From this, the webinar system generates a question for the user with a link to content about Italian sports cars, such as "Would you like to learn more about the advantages of Italian sports cars over German sports cars? Click here".

The webinar system may also include a user profile module that maintains user profiles. The user profile, for instance, may include a history of webinars viewed by a user, include a user's responses to interactive elements in a previous webinar, specify user's preferences, a user's location, a purchase history of the user, and so on. The webinar system then selects the interactive elements for exposure on based on the user profile. For instance, the webinar system may present written questions to a respective user device in a language specified by the user profile. In one example, the user profile module is configured to update the user profiles based on user responses received during a webinar in response to interactive elements exposed on user devices.

The webinar system may control exposure of the interactive elements on the user devices in a variety of ways as part of the webinar. In one example, the webinar system exposes interactive elements on user devices of the webinar based on an elapsed amount of time. The webinar system, for instance, may define a threshold amount of time (e.g., 90 seconds) as part of a timeline to control exposure interactive element on the user devices.

Additionally or alternatively, the webinar system may expose interactive elements on user devices based on an amount of content presented via the user device as part of the webinar. For instance, the webinar system may specify a threshold amount of content (e.g., three slides) of the webinar for exposure over a period of time before the webinar system exposes another interactive element on the user device.

In one example, the webinar system includes an interaction monitoring module to determine amounts of user interaction that occurs via respective user devices as part of the webinar. The interaction monitoring module, for instance, may receive data from respective user devices. Based on this data, the interaction monitoring module monitors device interactions reflecting user interactions with content of the webinar as part of the webinar, such as minimizing or maximizing a user interface that exposes the webinar, turning on or off a sound device, rewinding a part of the webinar, rearrangement of content within the webinar, pausing a topic of the webinar, and the like. From this, the interaction monitoring module determines engagement scores for the users of the webinar that indicate an amount of user interaction (i.e., a user's level of engagement or participation) in the webinar.

The webinar system may then determine which interactive elements are to be communicated for exposure on a user device based on the engagement scores. For instance, for users having an engagement score in a threshold range of engagement scores (e.g., between 0.25 and 0.75 for engagement scores normalized between zero and one), the webinar system may determine that the users are at least partially engaged with content of the webinar and select an interactive element to present to the users via their user devices automatically and without user intervention, such as by exposing a trial offer for a product of the webinar on the user devices. For users having an engagement score below the range of engagement scores (e.g., less than 0.25), the webinar system may determine that the users are not engaged with content of the webinar and may not present an interactive element on the user devices of these users.

Additionally or alternatively, the webinar system exposes interactive elements as part of the content on user devices at a rate based on the engagement scores determined by the interaction monitoring module. For instance, the webinar system may expose interactive elements on user devices of users with higher engagement scores with greater frequency (e.g., more often) than on user devices of users with lower engagement scores.

In one example of controlling output of the interactive elements, the webinar system maintains a pipeline of the interactive elements presented to each user via their user device, and assigns levels to the users based on the user responses and the interactive elements. For instance, the pipeline may indicate a level for a user based on the number of responses to interactive elements provided by the user. Hence, a first user who responds more than a second user to the interactive elements is assigned a higher level in the pipeline than the second user. Accordingly, the webinar system funnels users of the webinar through the pipeline based on the user responses to the interactive elements.

When a user fails to respond to an interactive element, the webinar system may freeze the level of the user in the pipeline, so that the user is not propagated through the pipeline. In one example, the webinar system ascertains whether user responses affirm or do not affirm a desired engagement with an interactive element. For instance, a user may provide a response that they are not interested in offers presented in interactive elements. In this case, the webinar system may freeze the level of the user in the pipeline to a current level, and cease to provide interactive elements to the user device of that user, thus improving operational efficiency of the webinar system.

Because different user devices may receive different interactive elements from the webinar system, the pipeline for each user represents a respective branch on a tree, and the length of the branch may indicate the level of the user. The webinar system may then determine which users of the webinar are to be considered as sales leads based on the levels for the users in the pipeline (e.g., the length of the branch for the user). For instance, the webinar system may select the users having levels in the pipeline greater than a level depth threshold as sales leads (e.g., at least a level of seven). In one example, the webinar system selects the users of the webinar who have the highest level in the pipeline as the sales leads. For instance, the webinar system determines at least some of the users as sales leads based on the at least some of the users having a highest number of responses to the interactive elements among users of the webinar.

In one example, the webinar system determines classes of the users based on the levels in the pipeline. The classes can correspond to ranges of levels (e.g., a first class may corresponds to level ten and higher, a second level may correspond to levels seven—nine, and a third level may correspond to levels five and six). The webinar system may also grade the sales leads based on the class that includes the users. For instance, users of the first class may be graded by the webinar system with an A-grade, users of the second class with a B-grade, and users of the third class with a C-grade. The webinar system may provide the sales leads to sales teams based on the grades. For example, the webinar system may provide A-grade sales leads to a sales team with a highest seniority (e.g., years of sales experience), and the C-grade sales leads to a sales team with a lowest seniority.

Accordingly, the webinar system can identify sales leads as users of the webinar who demonstrate an interest in the product of the webinar based on their responses to the interactive elements. Rather than simply provide an attendee list of the webinar as a sales lead list, the webinar system can explicitly omit users of the webinar as sales leads when the users are not likely or are uninterested in purchasing a product of the webinar. Hence, the webinar system identifies high-quality sales leads who have a high likelihood of purchasing a product of the webinar, and is thus more efficient than conventional webinar systems.

Term Examples

"Amount of user interaction" describes any suitable measure of user interaction with a computing device or content exposed by the computing device as part of a webinar. Examples include a number of user responses supplied by a user in response to interactive elements displayed as part of a webinar on a user device, a number of chats a user participates in during a webinar, a number of slides of a webinar viewed by a user, a number of attendees of a webinar that a participant communicates with during a webinar, combinations thereof, and the like. A webinar system, for instance, may quantify an amount of user interaction for a user by assigning an engagement score to a user that reflects a level of participation in a webinar on behalf of the user.

"Content" output as part of a webinar includes content of a webinar presented to user devices as part of the webinar, such as a slide presentation, video, interactive chalkboard, web page, map, document, etc.

"Content threshold" describes any suitable amount of content that can be used to determine when to display an interactive element on a user device as part of a webinar. For instance, a content threshold may be set to a value of three slides so that at least three slides are exposed during a webinar to a user via the user's device between interactive elements displayed to the user on a computing device.

"Device interactions" describe interactions that reflect user interactions with a user's device. Examples of user interactions include adjustment of a screen size (e.g., minimizing or maximizing a user interface that displays webinar content), adjusting a volume of a speaker on the computing device that broadcasts audio content of a webinar, enabling or disabling a function or application, such as disabling a chat window of a webinar application, typing of text in a user interface, and the like.

"Digital medium environment" describes any combination of the various computing devices and resources that can be utilized to implement the techniques, systems, and devices described herein. For instance, a digital medium environment may include at least one or more client computing devices, a network, and one or more server computing devices.

"Engagement score" describes any measure of a user's participation in a webinar and may be determined based on any suitable data, such as data representing user actions during a webinar (e.g., how often a user replays webinar content, whether a user has disabled sound at the user's computing device, etc.). In one example, an engagement score is normalized between zero and one, where zero represents little or no participation in the webinar, and one represents high or total participation in the webinar.

"Interactive element" describes any suitable element that can be provided during a webinar to a computing device operated by a user of the webinar for which the user can provide a response. For instance, interactive elements may be displayed on a computing device to present the interactive elements to a user of the computing device, and the user may enter a response to the interactive elements into the computing device. Examples of interactive elements include a poll, a chat, a quiz, a discussion, a request for confirmation, a request for information, a question, an offer, a reward, and the like. Examples of responses include text entered by a user, a selection of an option exposed in a user interface, a spoken response (e.g., user speech), a file uploaded by a user, etc.

"Levels" describe stages of a pipeline through which users of a webinar may be propagated based on the users' responses to interactive elements exposed during the webinar Each level can correspond to a respective stage of the pipeline.

"Level depth threshold" describes a number of stages or levels of a pipeline, such as ten, and may be used to determine a user as a sales lead. For instance, when a level in a pipeline assigned to a user is greater than the level depth threshold, the user may be determined to be a sales lead.

"Pipeline" describes any chain of stages through which any suitable data may be propagated to represent user responses to interactive elements during a webinar. For instance, a pipeline may represent a chain of stages through which a user is propagated during a webinar, and a current stage of the pipeline may indicate a level of the user representing a current number of the user's responses to interactive elements during the webinar. Hence, as a user responds to more interactive elements during the webinar, the user is propagated through the pipeline.

"Response" describes any user response to an interactive element exposed during a webinar, such as text supplied by a user, a user selection (e.g., confirmation of an option exposed in an interactive element), an answer to a quiz, and the like.

"Sales lead" describes a user representing a potential customer who may be interested in purchasing a product related to a webinar.

"Sales team" describes any person or persons who receive a sales lead and provide any suitable offer to the sales lead to entice them to purchase a product, such as by sending an advertisement to the sales lead (e.g., a coupon for a product), contacting the sales lead via email or phone call, and the like.

"User" describes any user who attends a webinar and may view or consume content of the webinar. Examples of users of a webinar can include students, employees, attendees of a church, online viewers, etc., who may participate in a webinar in real-time or on-demand. For instance, a pastor of a church may present a Mass or church service as an online webinar to a global church congregation.

"User profile" describes any data regarding a user of a webinar, such as a history of webinars viewed by a user, a user's responses to interactive elements in a previous webinar, a user's preferences, likes, dislikes, a user location, a purchase history of the user, occupation, etc.

"Webinar" describes a web-based, video and/or audio conference hosted by a webinar system that allow an audience of users to view and/or listen to content of the webinar in a live manner, on-demand, or combinations thereof. A presenter of a webinar may use a server device to provide content of a webinar to a plurality of user devices over a network, such as the Internet, and attendees may consume the content on the user devices. Content of the webinar may include videos, audio clips, presentation slides, maps, web pages, artworks, documents, etc. Attendees may participate in the webinar by not only consuming the content, but also asking questions to the presenter, answering questions on a quiz included in the webinar, communicating to other participants in the webinar via a chat, entering user selections in a poll, and the like. A webinar can include any suitable information and be for any suitable purpose, such as including educational information as part of a course or class, including product information as part of a marketing campaign, or including business information as part of a corporate meeting. Examples of systems that host webinars include Adobe® Connect, Coursera, EverWebinar, WebinarJam, GoToWebinar, WebEx, Demio, Zoom, and ClickMeeting.

"Webinar system" describes a platform that hosts webinars, such as Adobe® Connect, Coursera, EverWebinar, WebinarJam, GoToWebinar, WebEx, Demio, Zoom, and ClickMeeting. A webinar system may provide webinar content during a webinar form a server device to a plurality of user devices, which expose the webinar content to users of the webinar.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the described techniques. The illustrated digital medium environment 100 includes a user device 102 that can be operated by a user of a webinar (e.g., a participant of a webinar). Generally, the user device 102 can be any suitable computing device, such as a mobile phone, tablet, laptop computer, desktop computer, gaming device, goggles, glasses, wearable device (e.g., a wristband, watch, or headband), camera, digital assistant, echo device, navigation device, home appliance, copier, scanner, test and measurement equipment, vehicle computing system, and the like. Hence, user device 102 may range from a full resource device with substantial memory and processor resources (e.g., personal computers, game consoles) to a low-resource device with limited memory or processing resources (e.g., mobile devices).

Figure 9:
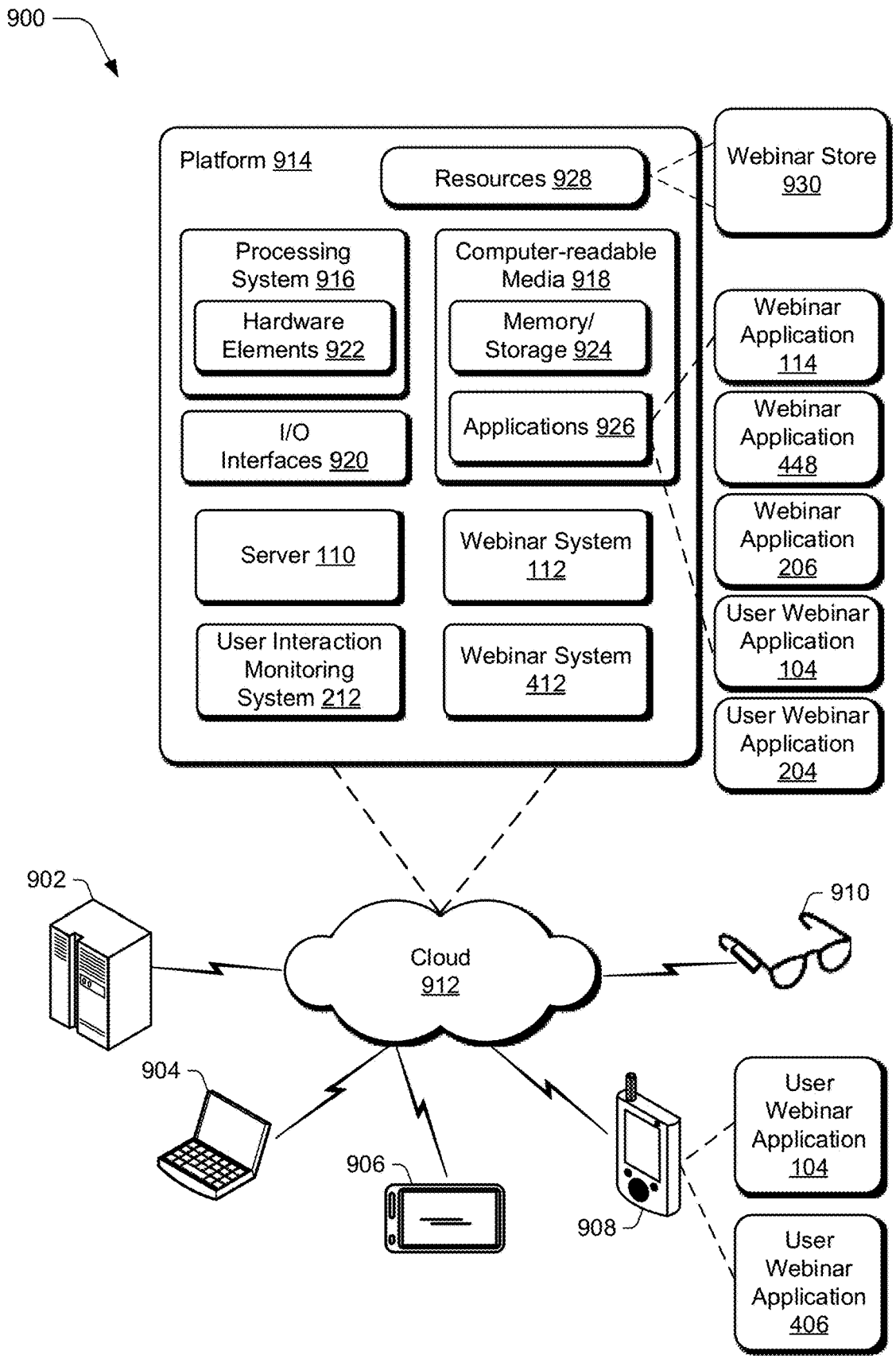
FIG. 9 illustrates an example system including various components of an example device that can be implemented

Furthermore, user device 102 may be representative of one or a plurality of different devices, such as one or more devices connected to a network that perform operations "over the cloud" as further described in relation to FIG. 9. In one example, user device 102 includes a plurality of computing devices communicatively coupled to each other, such as with a low power wireless communication standard (e.g., a Bluetooth® protocol). For instance, user device 102 may include a smart phone and a tablet coupled to one another (not shown in FIG. 1 for clarity).

The user device 102 includes a user webinar application 104 to allow a user to participate in an online webinar whose content can be exposed in a user interface 106 on the user device 102. Accordingly, the user device 102 is connected to network 108. Network 108 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof. Network 108 communicatively couples user device 102 with server 110.

Server 110 can include any suitable number of servers, and may be representative of one or a plurality of different devices. Server 110 includes webinar system 112 to determine user interaction within the webinar, and sales leads from the user interaction. For instance, webinar system 112 includes webinar application 114 which includes user interaction monitoring system 116 usable to monitor device interactions reflecting user interactions during a webinar, such as user interactions with content of the webinar exposed on the user device 102. Based on amounts of user interactions determined by user interaction monitoring system 116, the sales lead determination module 118 may determine one or more users of the webinar as sales leads.

For example, webinar system 112 incudes resources 120 that may provide webinar content 122, such as video, audio, a slideshow, and so forth, and interactive elements 124 to the user device 102. The interactive elements 124 can include any suitable interactive element, such as a question, poll, chat, offer, and the like. Interactive element 126 exposed in user interface 106 is an example of interactive elements 124 that can be provided to the user device 102 by the webinar system 112. The interactive element 126 prompts a user of the webinar to enter an email address in order to get a 30 day trial offer of a service or product related to the webinar. The user interaction monitoring system 116 of the webinar system 112 monitors device interactions reflecting user interactions during the webinar by obtaining interaction data 128, which can include any suitable data regarding device interactions reflecting user interaction during the webinar. Examples of which include an email address that a user enters in the interactive element 126, a window of user interface 106 exposing webinar content 122 that is maximized or minimized by a user, an indication of a part of the webinar content 122 that is paused or re-played by a user, etc. From this, the sales lead determination module 118 can then determine whether the user as a sales lead, and provide an offer, e.g., a coupon, to the user via the user device 102 to entice the user to purchase a product or service related to the webinar, or any other sort of digital content or digital marketing content.

User Interaction Determination within a Webinar

Figure 2:
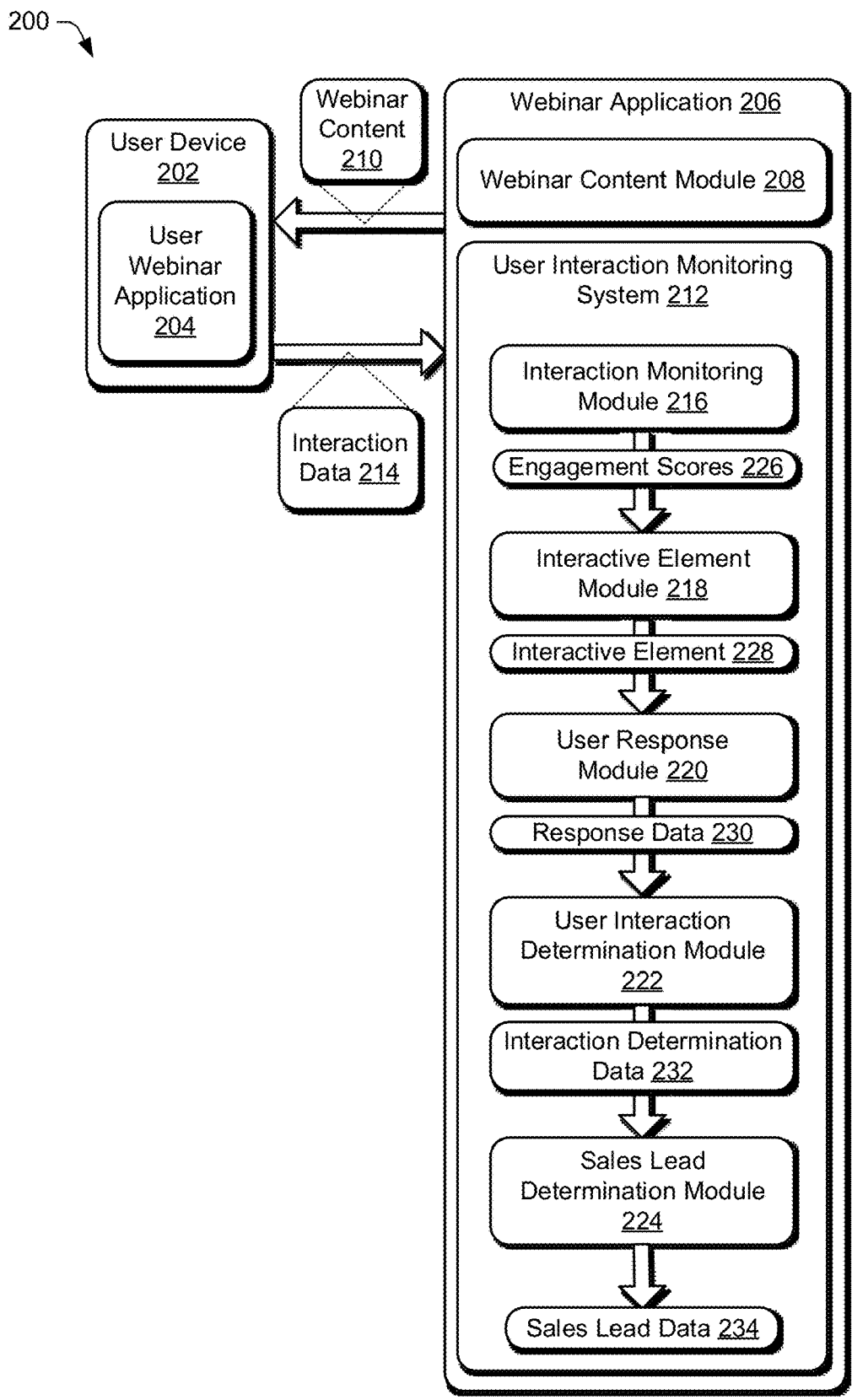
FIG. 2 illustrates an example system in an example implementation that is operable to employ techniques described herein.
Figure 3:
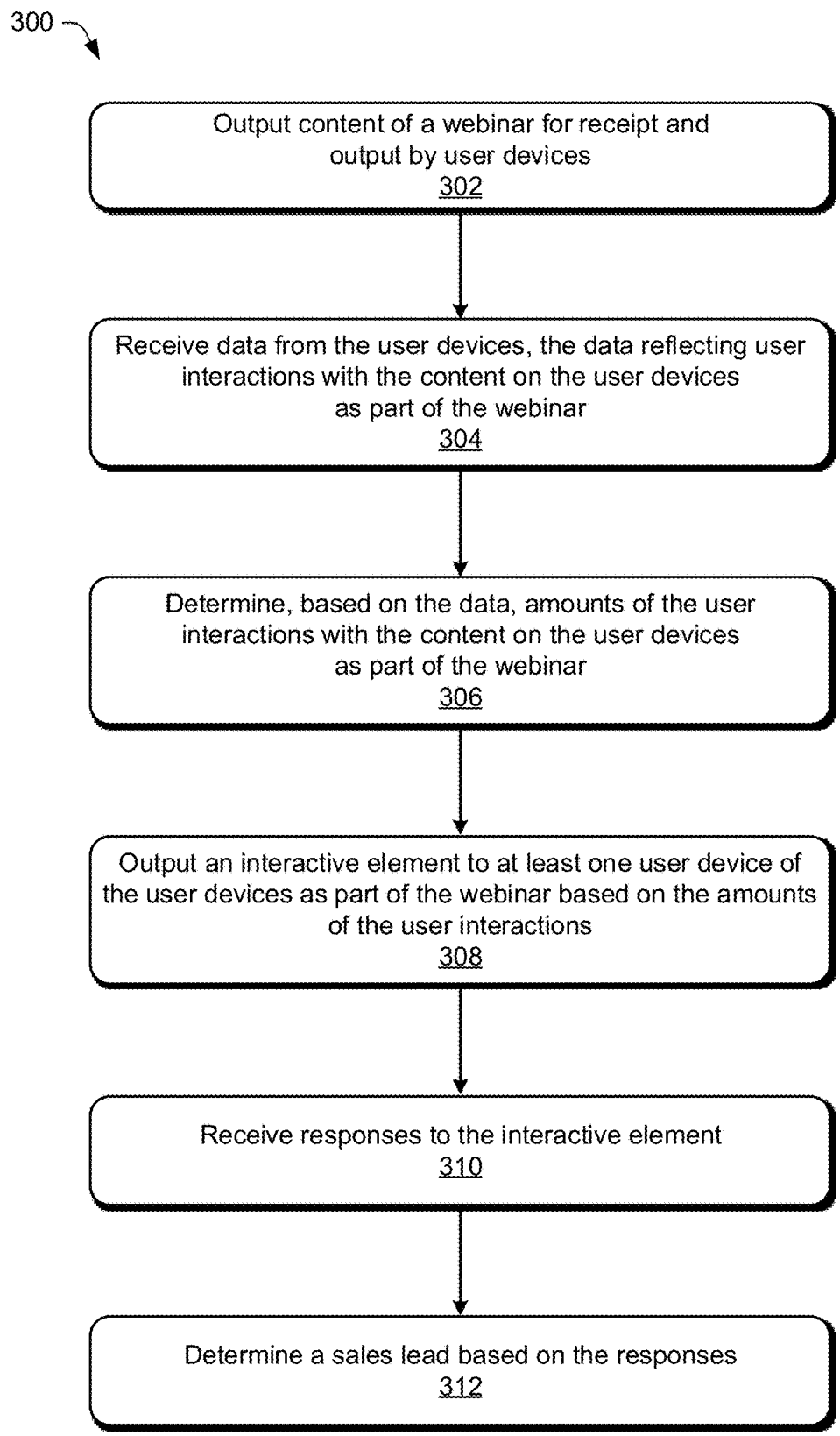
FIG. 3 illustrates a flow diagram depicting an example procedure in accordance with one or more aspects of the disclosure.

FIG. 2 illustrates a system 200 in an example implementation that is operable to employ techniques described herein, and FIG. 3 illustrates a procedure 300 in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. FIG. 2 and FIG. 3 are next described together, with references made to the modules of FIG. 2 that may implement the operations of FIG. 3.

FIG. 2 illustrates example data flow of the system 200, which includes user device 202 having a user webinar application 204 that is in communication with another webinar application 206. User device 202 is an example of the user device 102 in FIG. 1, and user webinar application 204 is an example of the user webinar application 104 in FIG. 1. Webinar application 206 is an example of webinar application 114 in FIG. 1.

In the illustrated example, webinar application 206 includes webinar content module 208 that provides webinar content 210 to user device 202. For instance, a user of user device 202 may subscribe to a webinar system or service including a webinar system that uses webinar content module 208 to output the content (illustrated as webinar content 210) to the user device 202 (block 302). The webinar application 206 also includes a user interaction monitoring system 212 to receive interaction data 214 from the user device 202. Interaction data 214 can include device interactions reflecting user interactions with the webinar content 210 on the user device 202. User interaction monitoring system 212 is an example of user interaction monitoring system 116 in FIG. 1, and includes interaction monitoring module 216, interactive element module 218, user response module 220, user interaction determination module 222, and sales lead determination module 224.

Interaction monitoring module 216 receives interaction data 214 (e.g., via network 108 and/or locally at the webinar system 112) to monitor device interactions reflecting user interactions with the webinar content 210 on user devices as part of the webinar (block 304). Interaction data 214 may include any suitable data regarding device interactions reflecting user interactions with content of the webinar, such as answers to quizzes of the webinar provided by the users, text of chats in the webinar, questions asked by users of the webinar, an amount of time or frequency users pause on content of the webinar, and so forth.

Interaction monitoring module 216 then determines amounts of user interaction, respectively, for the users of the user devices based on the monitored device interactions (block 306). For instance, interaction monitoring module 216 may determine the amounts of user interaction for the users with the content by computing respective engagement scores 226 for the users that indicate amounts of participation or engagement in the webinar, such as a number of discussions, chats, or polls the users participate in. The interaction monitoring module 216 then provides the determined amounts of user interaction to the interactive element module 218, such as by providing engagement scores 226 to the interactive element module 218 via an API.

The interactive element module 218 then determines which interactive element 228 to send to the user devices and present to the users for rendering, such as an offer or question, and outputs the interactive elements to at least one user device as part of the webinar based on the determined amounts of user interaction (block 308). For instance, the interactive element module 218 may make the determination based on user devices operated by users that have an amount of user interaction above a threshold amount. As an example, the interactive element module 218 may determine a first interactive element to output to user devices of users having an engagement score above a first engagement threshold (e.g., 0.4 in a range of zero to one), and a second interactive element to output to other user devices of users having an engagement score above a second engagement threshold (e.g., 0.7 in a range of zero to one).

User response module 220 then receives responses to the interactive elements (block 310). For instance, interaction data 214 received from user webinar application 204 may also include user responses to the interactive elements output to the user devices, such as an email address entered in an interactive element, a confirmation of a selection of an option in an interactive element, an affirmation or declination to receive additional interactive elements, and so forth. User response module 220 collects the user responses as part of generating response data 230, such as text of the user responses, a time delay from when an interactive element was output to a user device to when the user responded to the interactive element, and the like. User response module 220 provides the response data 230 to the user interaction determination module 222, e.g., via a respective API.

The user interaction determination module 222 and sales lead determination module 224 may then work together to determine a sales lead based on the responses (block 312). The user interaction determination module 222, for instance, receives the response data 230, and based on the user responses indicated by the response data 230, generates interaction determination data 232. The interaction determination data 232 is then used by the sales lead determination module 224 to generate sales lead data 234. For instance, based on the user responses to the interactive elements, the user interaction determination module 222 can propagate the users through a pipeline and assign levels in the pipeline to the users based on the number of user responses to the interactive elements received by user response module 220. Hence, the user interaction determination module 222 funnels users who demonstrate an interest in the webinar by responding to the interactive elements through the pipeline, while freezing a level in the pipeline for non-responsive users. The interaction determination data 232 indicates a respective level in the pipeline for the users of the webinar that is used to control output of interactive elements to the users, and more particularly user devices associated with the users.

The sales lead determination module 224 receives the interaction determination data 232 from the user interaction determination module 222, and from this generates sales lead data 234. The sale lead data 234 indicates one or more users of the webinar as sales leads. For instance, the sales lead determination module 224 may determine users having a highest level of interaction according to the interaction determination data 232 as sales leads, and identify these users in the sales lead data 234. The sales lead determination module 224 may also determine classes of the users based on the levels assigned to the users in the interaction determination data 232. A higher-rated class may correspond to the group of users having levels according to the interaction determination data 232 above a first depth level threshold, and a lower-rated class may correspond to another group of users having levels according to the interaction determination data 232 above a second depth level threshold but below the first depth level threshold. Hence, the sales lead data 234 may identify some of the users of the webinar as sales leads, and include a class or rating for the users.

The sales lead determination module 224 may provide the sales lead data 234 to one or more sales teams, who may then contact the users indicated in the sales lead data 234 to try to persuade the users to purchase a product or service related to the webinar In one example, the sales lead determination module 224 sends an offer automatically and without user intervention to the users indicated in the sales lead data 234, such as a coupon to purchase a product or service related to the webinar.

Pipeline and User Profile Control of Interactive Elements within a Webinar

Figure 4:
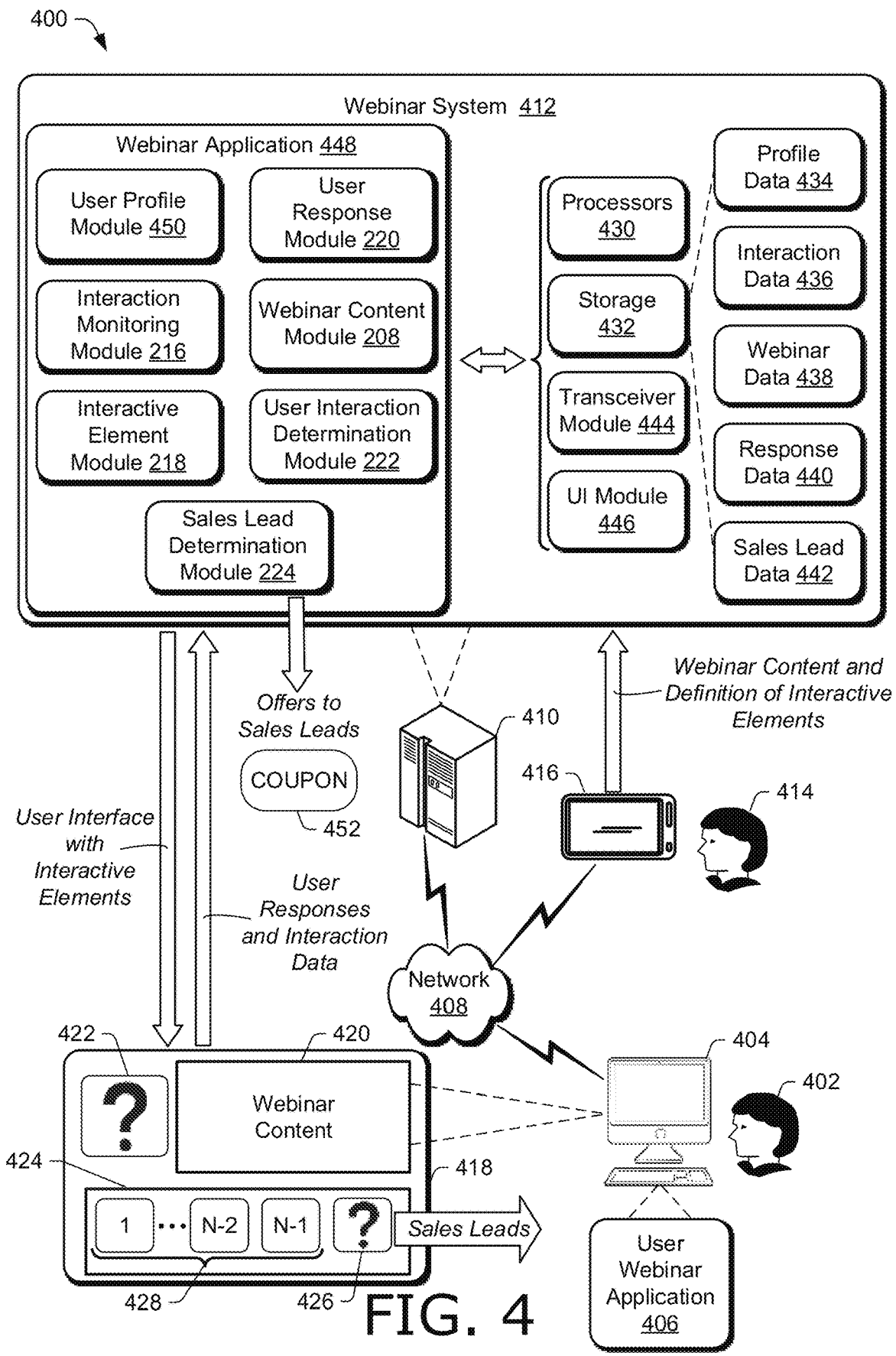
FIG. 4 illustrates a digital medium environment in an example implementation that is operable to employ techniques described herein.

FIG. 4 is an illustration of a digital medium environment 400 in an example implementation that is operable to employ techniques described herein using a pipeline to control output of interactive elements to user devices as part of a webinar. The illustrated digital medium environment 400 includes a user 402 (e.g., a user of a webinar) operating a computing device 404, i.e., the user device 102. Hence, the computing device 404 may be representative of one or a plurality of different devices, such as one or more devices connected to a network that perform operations "over the cloud" as further described in relation to FIG. 9, or a plurality of computing devices communicatively coupled to each other, such as with a low power wireless communication standard (e.g., a Bluetooth® protocol).

User 402 is illustrated proximate to computing device 404 to indicate that user 402 is operating computing device 404 as part of an online webinar in this example. Accordingly, the computing device 404 includes user webinar application 406 to allow the user 402 to participate in the online webinar via network 408 via device interactions with the computing device 303. User webinar application 406 is an example of user webinar application 104, and network 408 is an example of network 108 in FIG. 1.

Administrator 414 operates computing device 416, which is also communicatively coupled to the webinar system 412 via the network 408. Administrator 414 may be an author or presenter of the webinar, and may provide webinar content and a definition of interactive elements for exposure during the webinar to webinar system 412, which is an example of webinar system 112 in FIG. 1. In one example, administrator 414 presents content of the webinar to user 402 via webinar system 412 in a live fashion. Hence, during the webinar, user 402 may ask questions to the administrator 414, who may answer the questions asked by the user 402. Additionally or alternatively, during the webinar, administrator 414 may ask questions to the user 402, who may answer the questions asked by the administrator 414. For instance, the administrator 414 may call on the user 402 to write on an electronic chalkboard as part of the webinar, so the writings of the user 402 can be shared with other users of the webinar. Additionally or alternatively, administrator 414 may provide webinar content and a definition of interactive elements to webinar system 412 at one time, and user 402 may view the webinar on demand, such as at a different time. Hence, administrator 414 and user 402 may or may not access webinar system 412 at the same time, such as during a webinar.

Using user webinar application 406, computing device 404 exposes user interface 418. User webinar application 406 and user interface 418 are examples of user webinar application 104 and user interface 418 in FIG. 1, respectively. User interface 418 displays webinar content 420 and an interactive element 422, which are provided to user webinar application 406 from webinar system 412. The interactive element 422 may be configured in a variety of ways, such as a question, a poll, a chat, an offer, etc. User responses to interactive elements are provided to webinar system 412. For instance, interactive element 422 may include a prompt to enter an email address, and the user response provided from computing device 404 to webinar system 412 may include text representing the email address.

User interface 418 also includes pipeline 424 that exposes a representation 426 of interactive element 422, as well as representations 428 of previously-displayed interactive elements in user interface 418. For instance, representation 426 is illustrated at the $N^{th}$ level of pipeline 424 to denote that it represents the most recent interactive element for which user 402 has responded, whereas representations 428 are illustrated in the previous $N-1^{st}$ levels of the pipeline 424 to denote that they represent past interactive elements exposed in user interface 418 for which the user 402 has previously responded.

Webinar system 412 may maintain a pipeline similar to pipeline 424 for each user of the webinar. The webinar system 412 acts to funnel users of the webinar through the pipeline based on their responses to the interactive elements. For example, when a user ceases to respond to interactive elements in the user interface, the user is no longer propagated through the pipeline and their level is fixed. The webinar system 412 may determine sales leads from the levels of the users in the pipeline. For instance, webinar system 412 can require that a user have at least a level "N" in the pipeline to qualify as a sales lead, in which case user 402 would be determined as a sales lead. However, a user achieving only a level N-2 may not be included as a sales lead in this example.

In one example, the webinar system 412 contacts the users, via respective user devices, that are determined to be sales leads to entice the users to purchase a product. For instance, the webinar system 412 may send an email message to sales leads including an offer or coupon, such as a discount on the product of purchase or a different product (e.g., a discount on a cruise ship when a tool is purchased). The webinar system 412 may automatically and without user intervention send a communication to the sales leads identified by the webinar system 412, such as an advertisement, coupon, discount offer, and the like.

In one example, the webinar system 412 is configured as an application protocol interface (API) that can be licensed by webinar providers, such as Coursera, edX, Adobe Connect, WebEx, Skype, GoToMeeting™, and the like. Moreover, though webinar system 412 is illustrated in FIG. 4 as included in server 410, webinar system 412 can be implemented on any suitable device or devices. For instance, webinar system 412 may be implemented by server 410, computing device 404, computing device 416, or combinations thereof. Accordingly, user webinar application 406 may include a copy of webinar system 412. Moreover, computing device 416 may include a copy of webinar system 412.

Server 410 is an example of server 110 in FIG. 1, and includes webinar system 412 and webinar application 448 (discussed below in more detail) to monitor device interactions on user devices reflecting user interactions with the webinar content, determine amounts of user interaction within a webinar based on the device interactions, and determine sales leads from the amounts of user interaction. Webinar system 412 also includes processors 430, which can include any suitable number and any suitable type of processor, such as a graphics processing unit, central processing unit, digital signal processor, processor core, combinations thereof, and the like. In one example, webinar system 412 is implemented at least partially by storing instructions on storage 432 (e.g., a computer-readable storage medium) and executing the instructions on processors 430 included in webinar system 412. For instance, processors 430 may execute portions of webinar application 448.

Webinar system 412 includes storage 432, which can be any suitable type of storage accessible by or contained in webinar system 412. Storage 432 stores data in memory, and provides access to and from memory included in storage 432 for any suitable type of data. For instance, storage 432 includes profile data 434, including data associated with user profiles for users of a webinar, such as user profiles, a history of webinars viewed by a user, a user's responses to interactive elements in a previous webinar, a user's preferences, likes, dislikes, a user location, a purchase history of the user, and the like.

Storage 432 also includes interaction data 436, including data regarding a user's interaction in a webinar, such as device interactions reflecting user interactions with the webinar content on user. Interaction data 436 can include any data indicative of user actions during a webinar, such as an engagement score, minimizing or maximizing a user interface that exposes the webinar, turning on or off a sound device, rewinding a part of the webinar, pausing a topic of the webinar, answering a quiz during the webinar, entering a selection in a poll of the webinar, entering text in a chat of the webinar, and the like.

Storage 432 also includes webinar data 438, including data regarding a webinar, such as webinar content, interactive elements, a representation of a neural network (e.g., configuration and convolutional weights) used to determine an interactive element, and an indicator of a type of interactive element (e.g., a quiz, poll, chat, question, etc.). Webinar data 438 may also include thresholds used to determine when to expose an interactive element in a webinar, such as a content threshold. Webinar data 438 may also include timestamps of a timeline of a webinar at which interactive elements are exposed to users.

Storage 432 also includes response data 440, including data regarding user responses, such as text of a user response, a time it takes for a user to respond to an interactive element (e.g., a delay in the user response), an indicator of whether a user response affirms or does not affirm desired engagement with an interactive element, and a number of user responses for each user during a webinar. Response data 440 may also include statistics regarding user responses, such as how other users responded to an interactive element, a mean user response, a variance in numerical values of user responses, how many users responded to an interactive element, how many users did not respond to an interactive element, and the like.

Storage 432 also includes sales lead data 442, including data regarding sales leads, such as users determined by webinar system 412 to be sales leads, users of a webinar determined by webinar system 412 not to be sales leads, levels of users in a pipeline, and thresholds used to determined sales leads, such as a level depth threshold. Sales lead data 442 may also include classes of sales leads, such as graded sales leads (e.g., an A-class for users with a highest level in the pipeline and a B-class for users with a second-highest level in the pipeline). Sales lead data 442 may also include statistics of the sales leads, such as how many users of a webinar are selected as sales leads and how many users of the webinar are not selected as the sales leads, an average level in the pipeline for users of the webinar, how many users achieved different levels in the pipeline, and the like.

Webinar system 412 also includes transceiver module 444, which is representative of functionality configured to transmit and receive data using any suitable type and number of communication protocols. For instance, data within webinar system 412 (e.g., components of a user interface, such as webinar content and interactive elements) may be transmitted to computing device 404 with transceiver module 444 over network 408. Furthermore, data can be received from computing device 404 with transceiver module 444, such as user actions indicating engagement levels, user responses to interactive elements, and the like. In one example, transceiver module 444 communicates packetized data.

Webinar system 412 also includes user interface (UI) module 446, which is representative of functionality configured to generate, manage, and cause display of any suitable user interface, such as user interface 418. User interface module 446 can cause display of a user interface on any suitable computing device, such as computing device 404, computing device 416, and server 410. In one example, user interface module 446 provides user interface data (e.g., components of a user interface) to a computing device, such as computing device 404, which renders the data in a user interface. For instance, user interface module 446 may provide webinar content (e.g., webinar content 420) and interactive elements (e.g., interactive element 422) to user webinar application 406 of computing device 404, which exposes the webinar content and interactive elements in a user interface (e.g., user interface 418). Accordingly, user webinar application 406 and user interface module 446 may work together to cause display of a user interface on a computing device, such as computing device 404.

In one example, user interface module 446 provides data to be exposed in a pipeline of a user interface, such as pipeline 424. For instance, user interface module 446 may provide a history of interactive elements exposed to a user during a webinar, previous user responses to the interactive elements, representations of levels in the pipeline 424, representations of interactive elements (e.g., thumbnail images), and combinations thereof. These items may be exposed in a pipeline of a user interface maintained or generated by user interface module 446 (e.g., user interface 418). Additionally or alternatively, the user interface module 446 can be configured to cause display of representations of the interactive elements in a pipeline having stages corresponding to levels assigned to the users. Each stage may expose a representation of an interactive element in an order in which the interactive elements are displayed to a user.

A user interface of user interface module 446 can expose any suitable control options, such as options for selecting a webinar, including lists of webinars, options for selecting any suitable parameter used by webinar system 412 (e.g., threshold values), and options to enable webinar system 412 to generate sales leads (e.g., an "enable sales lead nurturing" button). A user interface maintained or generated by user interface module 446 may also include options to control playback of a webinar, such as pause, rewind, fast-forward, and loop.

A user interface of user interface module 446 can receive any suitable user input. In one example, a user interface of user interface module 446 receives user input including user responses to interactive elements exposed in the user interface. Various types of input devices and input instrumentalities can be used to provide user input via a user interface of user interface module 446. For example, the user interface can recognize input as being a mouse input, stylus input, touch input, input provided through a natural user interface, and the like. Thus, the user interface can recognize multiple types of gestures including touch gestures and gestures provided through a natural user interface. In one example, the user interface includes speech recognition, identification, and synthesis functionalities, microphones, and speakers that allow computing device 404 to communicate with a user in a conversation, e.g., a user conversation. Accordingly, user input provided to the user interface of user interface module 446 may include any suitable user input, such as text, speech, selections made with a gesture, combinations thereof, and the like.

A user interface generated or maintained by user interface module 446, along with any suitable information, such as configurations settings of the user interface, user gestures (e.g., user inputs), user preferences, interactive elements exposed in a user interface, user selections, user responses, data of a pipeline, webinar content, combinations thereof, and the like, used by or calculated by user interface module 446 are stored in storage 432 and made available to modules of webinar application 448. In one example, user interface module 446 provides webinar content and interactive elements to a client device, such as computing device 404, which exposes the webinar content and interactive elements in a user interface of user interface module 446. Additionally or alternatively, user interface module 446 may receive user responses as user input to a user interface of user interface module 446 that is exposed on a client computing device.

Webinar system 412 includes webinar application 448, which is an example of webinar application 114 in FIG. 1 and webinar application 206 in FIG. 2. Webinar application 448 includes the modules of webinar application 206, e.g., interaction monitoring module 216, interactive element module 218, user response module 220, webinar content module 208, user interaction determination module 222, and sales lead determination module 224, as well as user profile module 450. These modules work in conjunction with each other to monitor device interactions reflecting user interactions with webinar content on user devices, determine amounts of user interaction within a webinar based on the device interactions, and determine sales leads from the amounts of user interaction. Although generally shown and described as separate modules of the webinar application 448, any one or combination of the modules may be implemented together as a multi-function module, or independently as components of the webinar application 448.

User profile module 450 is representative of functionality configured to manage user profiles (e.g., as profile data 434) for users of webinars. A user profile managed by user profile module 450 can include any suitable data of users of webinars, such as a history of webinars viewed by a user, a user's responses to interactive elements in a previous webinar, a user's preferences, likes, dislikes, a user location, a purchase history of the user, a user's language, a user's employer or occupation, a user's marital status, physical attributes of the user, such as age, gender, height, weight, and so on. Webinar system 412 may use the user profiles managed by user profile module 450 to determine interactive elements that are presented to users of a webinar by exposing the interactive elements on user devices operated by the users.

In one example, user profile module 450 is configured to update user profiles during a webinar based on data received via a user interface. For instance, user profile module 450 may update the user profile of a user based on user responses received during the webinar to interactive active elements presented to the user by exposing the interactive elements on a user device operated by the user. As an example, text of a user response may indicate a user preference, such as a like of Italian cars over German cars, and this preference may be added to the user profile. Additionally or alternatively, user profile module 450 may update the user profile of a user based on device interactions reflecting user interactions during a webinar, such as an answer to a poll, an answer to a quiz, text of a chat or discussion among users of the webinar, etc.

The user profile module 450 can update a user profile at any suitable time. In one example, user profile module 450 accesses, via response data provided by the user response module 220, user responses collected over the duration of a webinar, and updates a user profile based on the user responses at the end of the webinar (e.g., when the webinar is completed). Additionally or alternatively, the user profile module 450 may update a user profile during a webinar, such as responsive to receiving a user response or response data from the user response module 220. User profile module 450 may provide a user profile for a current user of the webinar to interactive element module 218.

User profiles managed by user profile module 450, along with any suitable information, such as user responses, user input (e.g., text of a chat during a webinar), timestamps indicating when a user profile is updated, combinations thereof, and the like, used by or calculated by user profile module 450 are stored in profile data 434 of storage 432 and made available to modules of webinar application 448. In one example, user profile module 450 obtains user profiles from profile data 434 and provides the user profiles to interactive element module 218.

Interaction monitoring module 216 is representative of functionality configured to determine amounts of user interaction for users of a webinar as described in the previous section. Interaction monitoring module 216 may quantify the amounts of user interaction for users by determining engagement scores for users that represent a level of user engagement, or participation, in a webinar. Interaction monitoring module 216 can determine an amount of user interaction in any suitable way. In one example, interaction monitoring module 216 receives interaction data, such as data indicating device interactions reflecting user interactions with webinar content on user devices as part of the webinar. The interaction monitoring module 216 may determine engagement scores from the interaction data. For instance, user webinar application 406 can be configured to obtain interaction data for a user of a webinar and transmit the interaction data via network 408 to interaction monitoring module 216. Interaction data can include any suitable data representing user actions during a webinar. Examples of user actions for users of a webinar that may be represented by interaction data received by interaction monitoring module 216 are included in Table 1.

TABLE 1

Examples of User Actions for Users of a Webinar to Determine Engagement Scores

| | |
|---|---|
| User | Screen activeness (e.g., screen in focus and viewable, or minimized) |
| | Sound device switched on or off |
| | Movement of cursor (e.g., whether user moves cursor to chat window during an active chat) |
| | Participation in polls, quizzes, and chats (e.g., no participation, such as no response to poll, quiz, or chat; simple participation, such as terse answers (e.g., yes/no answers); or active participation, such as influencing topics) |
| | Rate of chat messaging as private (e.g., anonymous), public, or both |
| | Vocal involvement during webinar (e.g., answering a question, asking a question, replying when name is spoken) |
| | Language proficiency in spoken content (e.g., when asking a question) or written content (e.g., in a chat) |
| | Frequency of rewinding content |
| | Frequency of pausing content |
| | Playback speed of content (e.g., faster or slower than real time) |
| | Correctness of answers in quizzes and polls |
| | Time delay when answering polls, chats, quizzes, and questions |

Interaction monitoring module 216 may determine a respective engagement score for each user of a webinar. For instance, interaction data representing user actions during a webinar, such as listed in Table 1, for each user can each be assigned a respective weight by interaction monitoring module 216. An engagement score for a user can be determined from the respective weights for the user, such as by summing the respective weights, averaging the respective weights, forming a weighted combination of values assigned to user actions, and the like. In one example, interaction monitoring module 216 normalizes engagement scores, such as between zero and unity. Engagement scores determined by interaction monitoring module 216 represent amounts of user interaction of users in a webinar.

Interaction monitoring module 216 can generate engagement scores for users at any suitable rate, e.g., in real time. In one example, interaction monitoring module 216 determines a new engagement score for each user at predetermined time intervals of a webinar, such as equally-spaced time intervals. An engagement score generated by interaction monitoring module 216 can be based on any suitable time period. For instance, interaction monitoring module 216 may compute an engagement score at a current time interval using weights for users from the current time interval and weights for users from previous time intervals. Accordingly, interaction monitoring module 216 may be configured to update engagement scores of users throughout a webinar based on user actions of the users.

Amounts of user interaction determined by interaction monitoring module 216, along with any suitable information, such as engagement scores, interaction data, user actions, weights assigned by interaction monitoring module 216 to user actions, a time period of a webinar over which an engagement score is calculated, statistics of engagement scores across users of a webinar (e.g., mean, median, mode, variance, maximum, minimum, etc.), combinations thereof, and the like, used by or calculated by interaction monitoring module 216 are stored in interaction data 436 of storage 432 and made available to modules of webinar application 448. In one example, interaction monitoring module 216 provides engagement scores of users of a webinar to interactive element module 218.

Interactive element module 218 is representative of functionality configured to determine interactive elements to send to user devices during a webinar to expose the interactive elements to users of the webinar Interactive element module 218 can determine any suitable interactive element for exposure on user devices, such as a question, a poll, a chat, an offer, a reward, combinations thereof, and the like. Interactive element module 218 can also determine an interactive element in any suitable way, such as based on pre-determined interactive elements (e.g., interactive elements defined by an author or presenter of a webinar), interactive elements generated automatically during a webinar by an adaptive model (e.g., a neural network, machine learning model, or artificial intelligence), a level of a user in a pipeline assigned by user interaction determination module 222, combinations thereof, and the like.

In one example, interactive element module 218 generates an interactive element for a user based on a level of the user in a pipeline maintained by user interaction determination module 222, as indicated by the interaction determination data. For instance, the interactive element module 218 may determine that a user is assigned a highest level in the pipeline among all users of the webinar, and generate an advanced question for the user that requires a higher expertise level to answer than questions of other interactive elements, such as interactive elements provided by an author of the webinar.

Figure 5:
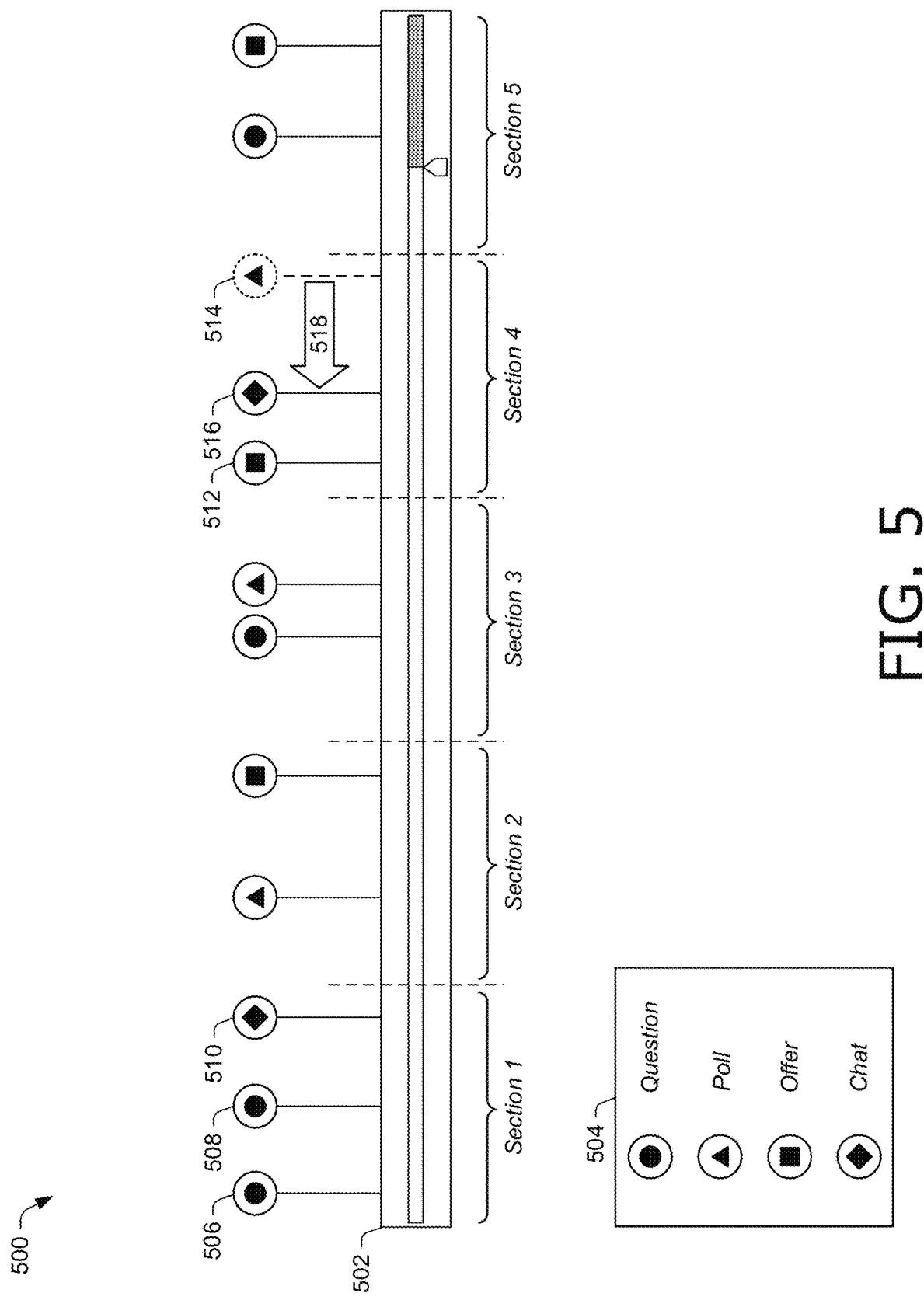
FIG. 5 illustrates an example placement of interactive elements in a webinar in accordance with one or more aspects of the disclosure.

FIG. 5 illustrates an example placement 500 of interactive elements in a webinar in accordance with one or more aspects of the disclosure. The interactive elements of FIG. 5 are examples of interactive elements determined and placed in a webinar by interactive element module 218. For instance, interactive element module 218 can send the interactive elements of FIG. 5 to a user device that exposes the interactive elements on the user device to present the interactive elements to users of the user devices.

FIG. 5 includes timeline 502 of a webinar, which is broken into five sections. In one example, these five sections are equally spaced (e.g., they each include a same amount of time of the timeline 502). Interactive elements are placed on the timeline 502 in each of the five sections, and key 504 indicates different types of the interactive elements. For instance, a dark circle encompassed by a circle indicates a question, a dark triangle encompassed by a circle indicates a poll, a dark square encompassed by a circle indicates an offer, and a dark diamond encompassed by a circle indicates a chat. A question, a poll, an offer, and a chat are examples of interactive elements that can be determined by interactive element module 218 to be exposed during a webinar.

In the example of FIG. 5, interactive element module 218 determines that three interactive elements are placed in the first section of timeline 502. For instance, interactive element 506 denotes a question towards the beginning of the first section, followed by interactive element 508 denoting another question in the middle of the first section, followed by interactive element 510 denoting a chat towards the end of the first section. The interactive elements 506, 508, and 510 may be pre-determined by an administrator, author, or presenter of the webinar and provided to interactive element module 218 prior to the webinar being viewed by users. For instance, an author of the webinar may define the content of the interactive elements 506, 508, and 510 as well as their placement on the timeline 502.

Additionally or alternatively, interactive element module 218 may generate one or more of the interactive elements during the webinar, such as based on content of the webinar. For instance, the webinar may include a slide regarding a type of automobile, and interactive element module 218 may generate a question for users of the webinar based on the type of automobile in the slide, such as "Would you like to see the specification sheet for this car?" In one example, the interactive element module 218 generates one or more of the interactive elements during the webinar based on a user's previously-received response. For instance, webinar system 412 may receive a user response to the question of interactive element 508, and in response, generate the interactive element 510 to be exposed to the user. Accordingly, interactive element module 218 may include an adaptive model, such as a neural network, machine learning model, or artificial intelligence, that has been trained to generate interactive elements based on inputs such as user responses, webinar content, and the like.

Interactive element module 218 may assign the interactive elements to the timeline 502 in any suitable way. In one example, interactive element module 218 assigns the interactive elements to the timeline 502 based on user input from an administrator, author, or presenter of a webinar. For instance, an author of the webinar may determine the placement of the interactive elements on the timeline 502 and provide definitions of the placement to the interactive element module 218.

Additionally or alternatively, interactive element module 218 may determine the placement of interactive elements on the timeline 502 based on one or more threshold criteria being satisfied, such as a time threshold, a content threshold, and an engagement threshold. For instance, a time threshold may include an amount of time of the timeline 502. Hence, interactive element module 218 may require that a threshold amount of time (e.g., 90 seconds) of the timeline 502 has passed since a previous interactive element was exposed to a user before interactive element module 218 exposes another interactive element to the user. Accordingly, the distance between any two interactive elements on the timeline 502 may be required to be greater than a threshold amount of time.

A content threshold may include an amount of content of a webinar, such as a number of slides. Hence, interactive element module 218 may require that a threshold amount of content (e.g., three slides) of the webinar has been exposed on a user device to a user since a previous interactive element was exposed on the user device to the user before interactive element module 218 exposes another interactive element on the user device to the user.

An engagement threshold may include a threshold engagement score. Hence, interactive element module 218 may require that a user have an engagement score determined by interaction monitoring module 216 that is greater than a threshold engagement score (e.g., greater than 0.25 for engagement scores normalized between zero and unity) before interactive element module 218 exposes an interactive element on a user device to the user.

In one example, interactive element module 218 determines an interactive element to display on a user device based on a user profile obtained by user profile module 450 of the user operating the user device. Interactive element module 218 may determine an interactive element to display on a user device based on any suitable data in a user profile of the user, such as a user's location, preferences, purchase history, etc. For instance, a user profile of a user may indicate that the user's employer is a suspension manufacturer. When the user views a webinar about automobiles, the interactive element module 218 may determine interactive elements that include content about suspension components, as opposed to engine components, so that webinar system 412 can determine if the user has a likelihood of purchasing suspension components for the user's employer. On the other hand, if the user profile indicated the user worked at an engine builder, the interactive element module 218 may determine interactive elements that include content about engine components, rather than suspension components.

Additionally or alternatively, interactive element module 218 may determine an interactive element to display on a user device based on a level of the user operating the user device in a pipeline indicated in interaction determination data generated by user interaction determination module 222. For instance, for users having a level greater than a first depth level threshold, such as two, interactive element module 218 may determine an interactive element with a first discount, such as 15% off a next webinar. However, for users having a level greater than a second depth level threshold, such as six, interactive element module 218 may determine an interactive element with a second discount, such as one free webinar. Hence, interactive element module 218 may determine a level of discount for an offer to a user in an adaptive fashion based on the levels assigned to the users in the pipeline.

Interactive element module 218 may add, remove, or adjust an interactive element in any suitable way and based on any suitable data. In one example, interactive element module 218 adjusts the content of an interactive element, the placement of an interactive element on timeline 502, or both the content and placement of an interactive element based on any suitable data, such as a user response, a user action during a webinar (e.g., one of the user actions in Table 1), content of the webinar, or combinations thereof. For instance, section four of timeline 502 includes an interactive element 512 that includes an offer. Section four of timeline 502 also includes an interactive element 514 that includes a poll. For instance, interactive element 514 may include a poll that was predetermined by the author of the webinar. Interactive element 514 is shown with dashed lines (e.g., in phantom) to indicate that interactive element module 218 has adjusted the interactive element 514 to create interactive element 516. Interactive element 516 is an adjusted version of interactive element 514, which has been moved to an earlier portion of section four of the timeline 502, and the content of interactive element 514 has been changed from a poll to a chat. This adjustment of content and placement on the timeline 502 is indicated by arrow 518. Interactive element module 218 may adjust the interactive element 514 to form interactive element 516 for any suitable reason, such as a user response to the offer of interactive element 512, an amount of time from the offer of interactive element 512 until a user response to the offer is received, combinations thereof, and the like.

Returning to FIG. 4, interactive elements determined by interactive element module 218, along with any suitable information, such as user actions, indicators of whether interactive elements are pre-determined (e.g., by an author of a webinar), generated by interactive element module 218, or adjusted by interactive element module 218, indicators of interactive elements that are added or removed, a time of a timeline of a webinar at which an interactive element is exposed on a user device, combinations thereof, and the like, used by or calculated by interactive element module 218 are stored in webinar data 438 of storage 432 and made available to modules of webinar application 448. In one example, interactive element module 218 provides interactive elements to user interface module 446 and user interaction determination module 222.

User response module 220 is representative of functionality configured to receive responses to interactive elements from users of a webinar. User response module 220 can receive user responses via user inputs to a user interface managed by user interface module 446, such as user interface 418. For instance, a user may provide a user input responsive to display of an interactive element in a user interface, and user webinar application 406 may communicate the user response to user response module 220 via the network 408.

User responses received by user response module 220 can include any suitable type of data, such as text (e.g., an email address, a typed answer to a question, a chat, etc.), and an audio response (e.g., a recording of user speech, a transcription of user speech, etc.). User responses may also include an indication of a user selection, such as a user choice in a multiple choice quiz, position of a switch set by a user in a user interface, an indication of a user confirmation, etc. User responses may also include any asset provided in response to an interactive element by a user, such as a document (e.g., a resume), a template that has been filled in or executed by the user (e.g., a registration form), an image, a video, and the like.

In one example, user response module 220 ascertains whether user responses affirm or do not affirm desired engagement with interactive elements. For instance, user response module 220 may determine intent of a user response, such as indicating whether the user wants to continue to be presented interactive elements on the user device operated by the user. User response module 220 may append metadata to the user response that represents the intent of the user. For instance, a value of a field may be populated, such as with zero indicating no intent of the user is determined, one indicating positive intent (e.g., the user wishes to receive another interactive element), two indicating the user does not wish to receive interactive elements on a specific subject (the subject indicated in another field of the metadata), and three indicating the user does not wish to receive interactive elements in general.

User responses received by user response module 220, along with any suitable information, such as response data including user input (e.g., text, user selections, gestures, etc.), metadata of user responses, such as fields populated with indicators of intent of a user response, an indicator of an interactive element (e.g., an identification number) to which a user response corresponds, combinations thereof, and the like, used by or calculated by user response module 220 are stored in response data 440 of storage 432 and made available to modules of webinar application 448. In one example, user response module 220 provides response data representing user responses to user profile module 450, interactive element module 218, and user interaction determination module 222.

Webinar content module 208 is representative of functionality configured to provide content of a webinar to user devices for exposure to users. Webinar content module 208 can obtain content of a webinar in any suitable way, such as from a database of webinars, from an author of a webinar (e.g., administrator 414), and the like. Accordingly, webinar system 412 may include or have access to a webinar database that includes content of webinars.

Webinar content module 208 can provide content of a webinar to user devices for exposure to users in any suitable way. In one example, webinar content module 208 provides content of a webinar in a live fashion. For instance, administrator 414 may present the webinar content at predetermined times to online users, such as user 402. The webinar content can include a live stream video sequence, including slides prepared by the administrator 414 of the webinar and images and audio of the administrator 414. Since the webinar is live, the administrator 414 may receive questions from users about the webinar in real time as the webinar is happening.

Additionally or alternatively, webinar content module 208 may provide content of a webinar that has been pre-recorded, such as by configuring the webinar as a video stream that can be accessed on-demand. For instance, the pre-recorded webinar may be accessed at any suitable time via a network by a user, and content of the webinar can be paused, rewound, replayed, skipped, etc. In one example, webinar content module 208 provides content of a pre-recorded webinar at one or more specified times, such as in a broadcast fashion. For instance, webinar content module 208 may broadcast content of a webinar to user webinar application 406 on client computing devices at predetermined times according to a schedule, such as Monday evenings at 7:00 PM.

Content (i.e., webinar content) provided by webinar content module 208 can include any suitable content, such as a video, slides, audio, etc. In one example, webinar content provided by webinar content module 208 is encoded into a video stream, the video stream having video frames that include content of at least one of a slide presentation, a video sequence, an animation sequence, a document, a map, a schematic, or a web page.

Content of a webinar provided by webinar content module 208, along with any suitable information, such as a source of a webinar (e.g., a database location), an author of a webinar, a video stream, slides, audio, a document, a web page, combinations thereof, and the like, used by or calculated by webinar content module 208 are stored in webinar data 438 of storage 432 and made available to modules of webinar application 448. In one example, webinar content module 208 provides webinar content to interactive element module 218, user interaction determination module 222, and user interface module 446.

User interaction determination module 222 is representative of functionality configured to determine interaction determination data for users of the webinar. User interaction determination module 222 maintains a pipeline of the interactive elements presented to each user, and data regarding the pipeline can be included in the interaction determination data. User interaction determination module 222 funnels users of the webinar through the pipeline based on the user responses to the interactive elements. When a user fails to respond to an interactive element, or requests to stop receiving interactive elements, user interaction determination module 222 may freeze the position of the user in the pipeline, so that the user is not propagated through the pipeline.

User interaction determination module 222 assigns levels to the users based on the user responses and the interactive elements. A level for a user corresponds to a position (e.g., depth) in the pipeline. For instance, the pipeline may indicate a level for a user based on the number of responses to interactive elements provided by the user. Hence, a first user who responds more than a second user to the interactive elements is assigned a higher level in the pipeline than the second user. Accordingly, the user interaction determination module 222 may propagate users through the pipeline in a funneling fashion based on the user responses to the interactive elements.

As an example, suppose 1000 users view a webinar and webinar system 412 presents a first interactive element to each of the users, but only half of the users provide a response to the interactive element. The first level of the pipeline may thus include 500 users, corresponding to the half of the webinar users who responded to the first interactive element. Next, suppose subsequent interactive elements are provided to the 500 users of the first level, and that one quarter of these 500 users respond to the subsequent interactive elements. User interaction determination module 222 may populate the second level of the pipeline with 125 users, corresponding to the quarter of the 500 users who responded to the subsequent interactive elements. Hence, a later level in the pipeline can have no more users than an earlier level in the pipeline, in a funneling fashion. Moreover, because different user devices may receive different interactive elements from the interactive element module 218 (e.g., based on the users' responses and user profiles), the pipeline for each user may represent a respective branch on a tree, and the length of the branch indicates the level of the user. The user interaction determination module 222 generates interaction determination data that includes the levels in the pipeline assigned to the users.

Interaction determination data determined by user interaction determination module 222, along with any suitable information, such as levels in a pipeline, user responses, interactive elements, numbers of users in each level of a pipeline, numbers of users presented a same interactive element, a number of different interactive elements provided to users at for each level of the pipeline, combinations thereof, and the like, used by or calculated by user interaction determination module 222 are stored in sales lead data 442 of storage 432 and made available to modules of webinar application 448. In one example, user interaction determination module 222 provides interaction determination data to interactive element module 218 and sales lead determination module 224.

Sales lead determination module 224 is representative of functionality configured to determine sales leads based on the interaction determination data generated by the user interaction determination module 222. Since users with higher levels in the pipeline have demonstrated a higher interest in the webinar by providing user responses to more interactive elements than users with lower levels in the pipeline, the users with higher levels are generally better sales leads than the users with lower levels (e.g., the users with higher levels may be more likely to purchase a product of the webinar than users with lower levels). Hence, sales lead determination module 224 determines at least some of the users as sales leads based on the levels for the users in the pipeline.

Sales lead determination module 224 can determine users as sales leads based on the levels of the users in the pipeline in any suitable way. In one example, sales lead determination module 224 requires that a user have a level that is at least a level depth threshold in the pipeline to be determined as a sales lead. For instance, users having a level in the pipeline equal to or greater than the level depth threshold may be determined by sales lead determination module 224 as sales leads, while users having a level in the pipeline less than the level depth threshold may be excluded by sales lead determination module 224 as sales leads.

Additionally or alternatively, sales lead determination module 224 may select the users as sales leads that have a highest level assigned to users of the webinar. For instance, if out of 1000 users of a webinar, 100 users have a level of ten in the pipeline and the remaining 900 users of the webinar have a level in the pipeline that is less than ten, then sales lead determination module 224 may select the 100 users having a level of ten as the sales leads.

In one example, sales lead determination module 224 determines classes of the users based on the levels in the pipeline. The classes can correspond to ranges of levels in the pipeline. For instance, a first class may correspond to level ten and higher, a second level may correspond to levels seven—nine, and a third level may correspond to levels five and six. The sales lead determination module 224 may grade the sales leads based on the class that includes the users. For instance, users of the first class may be graded by the sales lead determination module 224 with an A-grade, users of the second class with a B-grade, and users of the third class with a C-grade. The sales lead determination module 224 may provide the sales leads to sales teams based on the grades. For example, the sales lead determination module 224 may provide A-grade sales leads to a first sales team and the C-grade sales leads to a second sales team. The first team may have a highest seniority level and the second team may have a lowest seniority level. Seniority level can be determined in any suitable way, such as years of sales experience, performance in a previous time period (e.g., those sales teams who sold the most goods in the previous quarter or month may be considered to have a highest seniority level in a current quarter or month).

Sales lead determination module 224 may determine a user as a sales lead based on the levels of the users in the pipeline alone or in combination with any suitable data, such as a user response, engagement score, data of a user profile, interactive elements, etc. In one example, sales lead determination module 224 determines users as sales leads based on not only on the levels of the users in the pipeline, but also on the user responses to interactive elements exposed to the users on the user devices. As an example, a first user may have a level N in the pipeline and a second user may have a level M (M<N) in the pipeline based on the numbers of interactive elements responded to by the first and second users. For instance, the first user may have responded to more interactive elements than the second user. Sales lead determination module 224 may determine the second user as a sales lead, but not the first user, based on the second user providing a better user response to an interactive element than the first user. For instance, the second user may correctly answer a quiz when the first user incorrectly answers the quiz. Hence, sales lead determination module 224 may determine the second user as a sales lead based on the level of the second user in the pipeline and user responses provided by the second user.

Moreover, sales lead determination module 224 may send communications to users identified as sales leads. Sales lead determination module 224 can send any suitable communication to a sales lead, such as a communication to entice the sales lead to purchase a product (e.g., a product related to a webinar attended by the sales lead). For instance, sales lead determination module 224 may send an email, hard-copy (e.g., via a letter carrier), text message, video message, invitation on a social media platform, combinations thereof, and the like. Hence, sales lead determination module 224 may send a communication to a sales lead via the transceiver module 444. In the example in FIG. 4, sales lead determination module 224 sends an offer including coupon 452 to users of the webinar determined by sales lead determination module 224 to be sales leads.

A communication sent by the sales lead determination module 224 can include any suitable offer designed to entice a sales lead to purchase a product, such as a coupon (e.g., a percentage off a manufacturer's suggested retail price), a reward (e.g., a free or discounted vacation package, a free trial of software, etc.), a buy-some-get-one-free offer (e.g., buy four months worth of a license and get one month free), combinations thereof, and the like. In one example, sales lead determination module 224 communicates an offer for a product to a user of a webinar that the user attended and during which the webinar system 412 determined the user to be a sales lead. For instance, the webinar may have been about musical instruments, and during the webinar, the user may have responded to interactive elements regarding guitars. Accordingly, the sales lead determination module 224 may communicate offers for guitars to the user.

In one example, sales lead determination module 224 communicates offers to sales leads automatically and without user intervention responsive to sales lead determination module 224 determining the sales leads. For instance, during a webinar attended by 1000 users, the sales lead determination module 224 may determine 100 of the 1000 users as sales leads based on the responses of the 100 users to interactive elements displayed during the webinar. Sales lead determination module 224 may automatically and without user intervention send an offer to the 100 users for a product related to the webinar. In one example, sales lead determination module 224 communicates an offer to the 100 users during the webinar, such as by sending a text message to user devices operated by the users. Additionally or alternatively, sales lead determination module 224 can communicate an offer for a product to the 100 users after the webinar (e.g., once the webinar has ended).

In one example, sales lead determination module 224 communicates offers to sales leads in an order of the sales leads. For instance, sales lead determination module 224 may communicate product offers to sales leads based on grades assigned to the sales leads. Hence, sales leads being assigned higher or better grades, such as an A grade, may receive a product offer from the sales lead determination module 224 prior to sales leads being assigned lower or worse grades, such as a C grade.

Sales leads determined by sales lead determination module 224, along with any suitable information, such as levels in a pipeline, user responses, interactive elements, numbers of users in each level of a pipeline, numbers of users presented a same interactive element, a number of different interactive elements provided to users at for each level of the pipeline, communications sent by sales lead determination module 224, an indicator of a type of offer sent (e.g., a discount offer, a reward offer, etc.), an indication of a type of communication sent (e.g., an indicator of an e-mail, chat, phone call, etc.), a list of sales leads to whom offers are sent, a timestamp indicating when an offer is sent, an order of offers, combinations thereof, and the like, used by or calculated by sales lead determination module 224 are stored in sales lead data 442 of storage 432 and made available to modules of webinar application 448. In one example, sales lead determination module 224 provides sales leads to a sales team.

The systems and procedures described herein constitute an improvement over conventional systems and procedures that do not determine users as sales leads based on their participation during a webinar, and instead merely report all attendees of a webinar as potential sales leads. By presenting interactive elements to users of a webinar, and funneling the users through a pipeline based on the user responses to the interactive elements, the systems and procedures described herein determine users of the webinar who demonstrate an interest in the product of the webinar, and select these users as sales leads. Moreover, the systems and procedures described herein may determine users of the webinar who do not demonstrate an interest in the product of the webinar based on a lack of user responses, and may omit these users as sales leads. Accordingly, the systems and procedures described herein determine high-quality sales leads who have a high likelihood of purchasing a product of the webinar, and are thus more efficient than conventional systems and procedures that determine sales leads from attendees of a webinar.

Example User Interfaces

Figure 6:
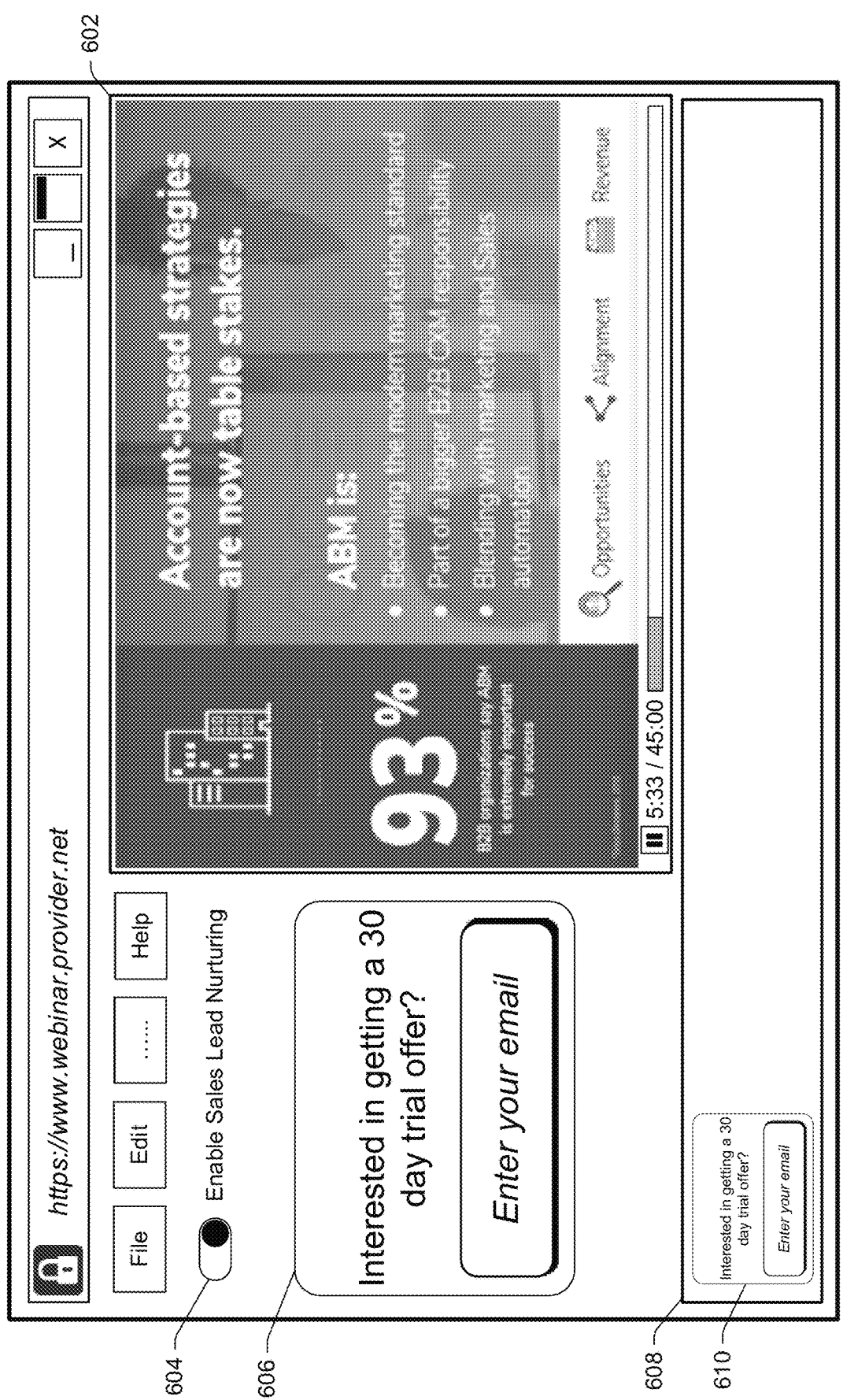
FIG. 6 illustrates an example user interface in accordance with one or more aspects of the disclosure.
Figure 7:
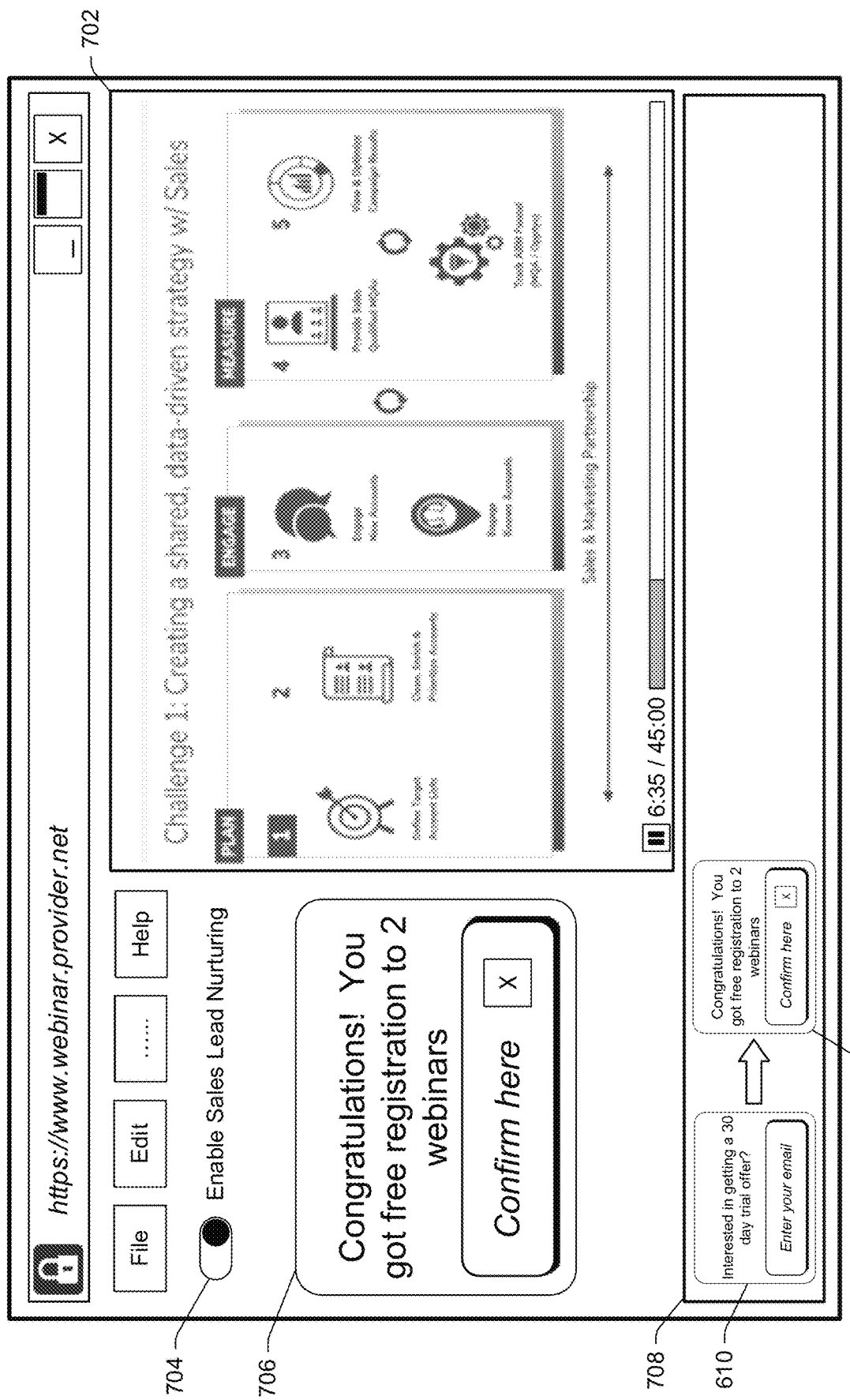
FIG. 7 illustrates an example user interface in accordance with one or more aspects of the disclosure.
Figure 8:
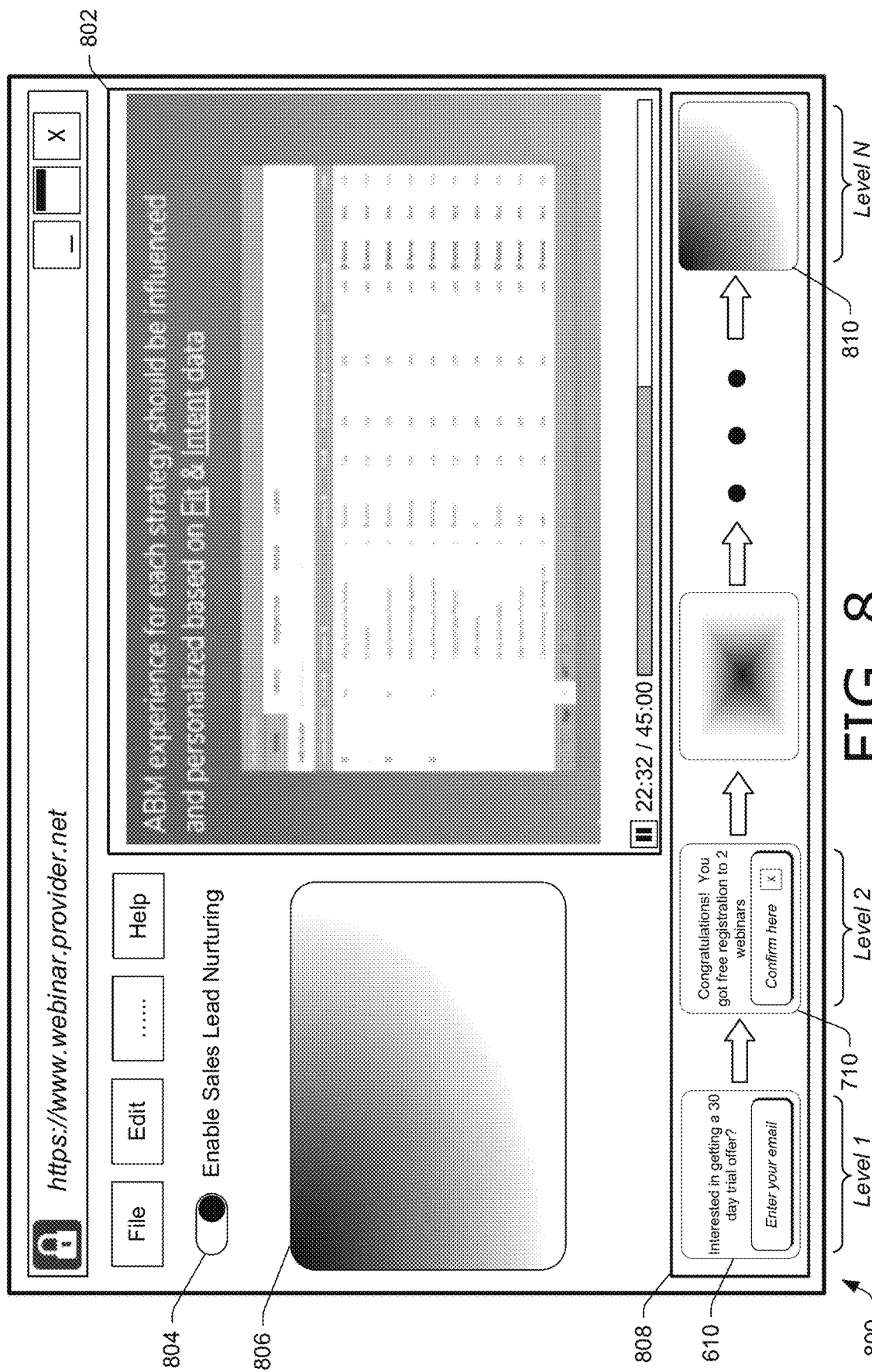
FIG. 8 illustrates an example user interface in accordance with one or more aspects of the disclosure.

FIG. 6—FIG. 8 illustrate example user interfaces which may be caused to be displayed by webinar system 112 or webinar system 412 on a computing device, such as user device 102 or computing device 404. The example user interfaces of FIG. 6-FIG. 8 can be displayed in succession on a user device to a user of a webinar. For instance, the display of user interface of FIG. 6 can precede the display of the user interface of FIG. 5, which can precede the display of the user interface of FIG. 6.

FIG. 6 illustrates an example user interface 600 in accordance with one or more aspects of the disclosure. User interface 600 includes webinar content 602, which is an example of webinar content provided by webinar content module 208. The timeline at the bottom of webinar content 602 indicates a current time of the webinar as 5 minutes, 33 seconds, and that the duration of the webinar is 45 minutes.

User interface 600 also includes selector 604 which, when selected, enables sales lead nurturing. For instance, when selector 604 is selected, the webinar system may funnel users of the webinar through a pipeline based on the users' responses to interactive elements exposed to the users via user devices operated by the users, and select some of the users in the pipeline as sales leads. In one example, selector 604 can be enabled and disabled by an administrator, author, or presenter of the webinar, such as administrator 414 in FIG. 4. A representation of selector 604 may be displayed in user interface 600 to users of the webinar Additionally or alternatively, selector 604 may be enabled and disabled by a user of the webinar, such as user 402 in FIG. 4.

In the example in FIG. 4, selector 604 is enabled (as indicated by the dark circle and its position in selector 604). Accordingly, webinar content 602 is not maximized within user interface 600 (e.g., the webinar content 602 does not consume all the display space of the user interface 600), and user interface 600 displays interactive element 606 and pipeline 608. Interactive element 606 is an example of an interactive element determined by interactive element module 218, and may be a first interactive element of the webinar presented to a user viewing the webinar via user interface 600. Interactive element 606 includes an offer for the user of user interface 600. For instance, interactive element 606 offers the user if they are "Interested in getting a 30 day trial offer?" of the webinar content 602. To confirm that the user is interested in the trial offer, interactive element 606 includes a section to "Enter your email". For instance, a user may type an email address in interactive element 606 to confirm that the user is interested in the trial offer. When a user enters an email address in interactive element 606, the email address is communicated as part of a user response to interactive element 606 to user response module 220 of the webinar system.

Responsive to receiving the user response to interactive element 606 (e.g., an email address), the webinar system assigns a first level (e.g., level one) to the user. To indicate that the user has been placed in the pipeline 608, the webinar system causes a representation 610 of interactive element 606 to be displayed in the pipeline 608. Generally, the webinar system can expose any suitable data or representation in the pipeline 608 to indicate that a user has been placed in the pipeline 608, such as a representation of the interactive element 606, (e.g., a thumbnail image of interactive element 606), the user response to the interactive element 606 (e.g., an email address), a level indicator (e.g., a number), a representation of the user (e.g., an image or avatar of the user), a timestamp of the webinar at which the user is assigned the level, combinations thereof, and the like.

FIG. 7 illustrates an example user interface 700 in accordance with one or more aspects of the disclosure. User interface 700 includes webinar content 702, which is an example of webinar content provided by webinar content module 208. The timeline at the bottom of webinar content 702 indicates a current time of the webinar as 6 minutes, 35 seconds, indicating that webinar content 702 is presented later in the webinar than webinar content 602 in FIG. 6 (which indicated a time of 5 minutes, 33 seconds in the webinar). User interface 700 also includes selector 704, which is an example of selector 604 in FIG. 6.

User interface 700 also displays interactive element 706 and pipeline 708. Interactive element 706 is an example of an interactive element determined by interactive element module 218, and includes a reward for the user of user interface 700. For instance, interactive element 706 states "Congratulations! You got free registration to 2 webinars" and includes a checkbox for the user to confirm that they want to receive the free registration. When a user confirms via the checkbox of interactive element 706, the confirmation is communicated as part of a user response to interactive element 706 to user response module 220 of the webinar system.

Responsive to receiving the user response to interactive element 706, the webinar system causes a representation 710 of interactive element 706 to be displayed in the pipeline 708. The pipeline 708 has stages that expose data representations, such as representations of the interactive elements, in an order in which the interactive elements are displayed to the user. Accordingly, representation 710 is displayed following the representation 610 in the pipeline 708, e.g., representation 710 is displayed in a later stage or level of the pipeline 708 than the representation 610.

FIG. 8 illustrates an example user interface 800 in accordance with one or more aspects of the disclosure. User interface 800 includes webinar content 802, which is an example of webinar content provided by webinar content module 208. The timeline at the bottom of webinar content 802 indicates a current time of the webinar as 22 minutes, 32 seconds, indicating that webinar content 802 is presented later in the webinar than webinar content 602 in FIG. 6 and webinar content 702 in FIG. 7. User interface 800 also includes selector 804, which is an example of selector 604 in FIG. 6.

User interface 800 also displays interactive element 806 and pipeline 808. Interactive element 806 is an example of an interactive element determined by interactive element module 218, and can include any suitable content, such as a question, a poll, a chat, an offer, a reward, and the like.

Responsive to receiving a user response to interactive element 806, the webinar system causes a representation 810 of interactive element 806 to be displayed in the pipeline 808. The representation 810 corresponds to level N in the pipeline 808, and representation 610 of FIG. 6 and representation 710 of FIG. 7 correspond to level 1 and level 2 of the pipeline 808, respectively. Supposing that interactive element 806 is the final interactive element exposed to the user of the webinar operating user interface 800, or that the user does not respond to subsequent interactive elements, then the webinar system assigns a level of N to the user, since this level is the highest level in the pipeline 808 in which the user is funneled.

Based on the user being assigned a level of N in the pipeline 808, the webinar system may select the user as a sales lead. For instance, the webinar system may compare the level N assigned to the user to a level depth threshold. If the level N is greater than the level depth threshold, then the webinar system may determine the user as a sales lead. However, if the level N is not greater than the level depth threshold, then the webinar system may not determine the user as a sales lead. For instance, the webinar system may omit the user from a list of sales leads if the level N is not greater than the level depth threshold.

Example Systems and Devices

FIG. 9 illustrates an example system generally at 900 that includes example computing devices 902-910. Computing devices 902-910 can be any suitable computing device (e.g., client computing devices). User device 102 in FIG. 1, user device 202 in FIG. 2, and computing device 404 in FIG. 4 are examples of computing devices 902-910. Computing devices 902-910 may include an on-chip system, multiple computing devices, combinations thereof, or any other suitable computing device or computing system. Accordingly, FIG. 9 illustrates computing devices 902-910 as one or more of a tablet, a laptop computer, a smart phone, smart eye glasses, and a desktop computer, though these examples are illustrative and in no way are meant to limit the type or number of devices included in computing devices 902-910. Computing devices 902-910 include user webinar application 104 and user webinar application 406, which operate as described above to support user interaction determination within a webinar system. For clarity, only computing device 908 is illustrated in FIG. 9 as including user webinar application 104 and user webinar application 406.

Furthermore, computing devices 902-910 are coupled to "cloud" 912 including platform 914 that is representative of one or more computing systems and devices that may implement the various techniques described herein, such as edge servers, global servers, or combinations thereof. This is illustrated through inclusion of webinar application 114, webinar application 448, webinar application 206, user webinar application 104, user webinar application 204, webinar system 112, webinar system 112, user interaction monitoring system 212, and server 110 in modules of platform 914, which operate as described above.

Functionality of computing devices 902-910 may be implemented all or in part through use of a distributed system, such as over a "cloud" 912 via a platform 914. Furthermore, platform 914 may host data accessible by computing devices 902-910, and therefore computing devices 902-910 may be required to be authenticated to platform 914.

Platform 914 includes a processing system 916, one or more computer-readable media 918, and one or more I/O interfaces 920 that are communicatively coupled to each other. Although not shown, platform 914 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 916 is representative of functionality to perform one or more operations using hardware. Accordingly, processing system 916 is illustrated as including hardware elements 922 that may be configured as processors, functional blocks, and so forth. This may include implementation in hardware as an application specific integrated circuit or other logic device formed using one or more semiconductors. Hardware elements 922 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 430 in FIG. 4 are examples of processing system 916.

Computer-readable media 918 (e.g., computer-readable storage media) is illustrated as including memory/storage 924. Storage 432 in FIG. 4 is an example of memory/storage included in memory/storage 924. Memory/storage 924 may include volatile media (such as random access memory (RAM)), nonvolatile media (such as read only memory (ROM), Flash memory, optical disks, magnetic disks, and so forth), or combinations thereof. Memory/storage 924 may include fixed media (e.g., RAM, ROM, a fixed hard drive, and so on) as well as removable media (e.g., Flash memory, a removable hard drive, an optical disc, and so forth). Computer-readable media 918 may be configured in a variety of other ways as further described below.

Input/output interface(s) 920 are representative of functionality to allow a user (e.g., a system administrator of platform 914) to enter commands and information to platform 914, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, platform 914 may be configured in a variety of ways as further described below to support user interaction.

Platform 914 also includes applications 926. Applications 926 are representative of any suitable applications capable of running on platform 914, and may include a web browser which is operable to access various kinds of web-based resources (e.g., webinars, assets, media clips, images, content, configuration files, services, user profiles, advertisements, coupons, and the like). Applications 926 include webinar application 114, webinar application 448, webinar application 206, user webinar application 104, and user webinar application 204, as previously described. Furthermore, applications 926 includes any applications supporting webinar system 112, webinar system 112, user interaction monitoring system 212, or server 110.

Cloud 912 includes and is representative of a platform 914. Platform 914 abstracts underlying functionality of hardware (e.g., servers) and software resources of cloud 912, and includes resources 928. Resources 928 may include applications, data, services, webinars, and content that can be utilized while computer processing is executed on servers that are remote from computing devices 902-910. Resources 928 can also include services provided over the Internet, through a subscriber network, such as a cellular or Wi-Fi network, or combinations thereof.

Generally, resources 928 may be licensed, purchased, or may be made freely available, (e.g., without authentication, license, or account-based access). The resources 928 can include any suitable combination of services and content, such as a webinar service, an on-line shopping service, an image editing service, an artwork drawing service, a web development and management service, a collaboration service, a social networking service, a messaging service, an advertisement service, a graphics design service, an animation service, an image storage service (including storage of photos, documents, records, files, and the like), a graphics editing service, an asset distribution service, and so forth. Content may include various combinations of assets, including webinars, videos, ads, audio, multi-media streams, animations, digital images, digital artworks, web documents, web pages, applications, device applications, text documents, drawings, presentations, photographs (e.g., stock photographs), user profiles, user preferences, user data (e.g., images stored in an image gallery), maps, computer code, and the like. Resources 928 include webinar store 930, which operates to provide webinar content to a webinar system (e.g., webinar system 112) that facilitates users to participate in webinars on computing devices, such as computing devices 902-910.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by platform 914. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the platform 914, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 922 and computer-readable media 918 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 922, or combinations thereof. Platform 914 may be configured to implement particular instructions and functions corresponding to the software and hardware modules. Accordingly, implementation of a module that is executable by platform 914 as software may be achieved at least partially in hardware, e.g., through use of computer-readable storage media and hardware elements 922 of processing system 916. The instructions and functions may be executable/operable by one or more articles of manufacture (for example, processing system 916) to implement techniques, modules, and examples described herein.

Conclusion

In one or more implementations, a digital medium environment includes at least one computing device. Systems, devices, and techniques are described herein for user interaction determination within a webinar system. A computing device, such as a server computing device implemented in a cloud-based system, implements a webinar system that exposes interactive elements during a webinar on user devices, such as a question, poll, chat, offer, and the like. Interactive elements may be pre-determined (e.g., by an author of a webinar) or generated by the webinar system, such as based on the webinar content, a user response to an interactive element, a user profile, or an engagement level of the user in the webinar. The webinar system maintains a pipeline that assigns levels to the users based on the user responses and the interactive elements, and determines users of the webinar as sales leads based on the levels for the users in the pipeline, such as by selecting the users having levels in the pipeline greater than a level depth threshold. Accordingly, the webinar system identifies sales leads as users of the webinar who demonstrate an interest in the product of the webinar based on their responses to the interactive elements, rather than simply an attendee list of the webinar. Thus, the webinar system identifies high-quality sales leads who have a high likelihood of purchasing a product of the webinar, and is thus more efficient than conventional webinar systems.

Although implementations of user interaction determination within a webinar system have been described in language specific to features and/or methods, the appended claims are not necessarily limited to the specific features or methods described. Rather, the specific features and methods are disclosed as example implementations of user interaction determination within a webinar system, and other equivalent features and methods are intended to be within the scope of the appended claims. Further, various different examples are described and it is to be appreciated that each described example can be implemented independently or in connection with one or more other described examples.

What is claimed is:

1. A webinar system implemented by a computing device in a digital medium environment, the webinar system comprising:

a processing system; and at least one computer readable medium having instructions stored thereon that, responsive to execution by the processing system, causes the processing system to perform operations including:

providing content as part of a webinar for exposure on user devices to a plurality of users;

exposing interactive elements on the user devices to the plurality of users as part of the webinar;

receiving responses to the interactive elements from the user devices;

assigning levels to the plurality of users based on the responses received via the interactive elements;

propagating indicators of the users through a pipeline having stages corresponding to the levels assigned to the users;

causing display of the interactive elements in the pipeline; and determining at least one user of the plurality of users is a sales lead based on the levels assigned to the plurality of users.

2. The webinar system as described in claim 1, wherein the operations include determining engagement scores for the plurality of users of the webinar, and selecting which users of the plurality of users are to be exposed to the interactive elements based on the engagement scores.

3. The webinar system as described in claim 1, wherein the operations include obtaining user profiles for the plurality of users, and selecting the interactive elements from a plurality of interactive elements based on the user profiles.

4. The webinar system as described in claim 1, wherein the operations include determining the at least one user of the plurality of users is the sales lead by comparing the stages in the pipeline for the plurality of users to a level depth threshold.

5. The webinar system as described in claim 1, wherein the operations include causing display of the responses received via the interactive elements in the pipeline, the stages arranged in an order in which the interactive elements are exposed on a user device to a user.

6. The webinar system as described in claim 1, wherein the operations include determining at least one of the interactive elements as having a discount amount based on the levels assigned to the plurality of users.

7. The webinar system as described in claim 1, wherein the operations include propagating the indicators of the users through the pipeline in a funneling fashion so that an earlier stage in the pipeline indicates more of the users than a later stage in the pipeline.

8. In a digital medium webinar system environment, a method implemented by a computing device, the method comprising:

providing, by the computing device, content as part of a webinar for exposure on user devices to a plurality of users;

exposing, by the computing device, interactive elements on the user devices to the plurality of users as part of the webinar;

receiving, by the computing device, responses to the interactive elements from the user devices;

assigning, by the computing device, levels to the plurality of users based on the responses received via the interactive elements;

propagating, by the computing device, indicators of the users through a pipeline having stages corresponding to the levels assigned to the users;

causing, by the computing device, display of the interactive elements in the pipeline; and determining, by the computing device, at least one user of the plurality of users is a sales lead based on the levels assigned to the plurality of users.

9. The method as described in claim 8, further comprising determining engagement scores for the plurality of users of the webinar, and selecting which users of the plurality of users are to be exposed to the interactive elements based on the engagement scores.

10. The method as described in claim 8, further comprising obtaining user profiles for the plurality of users and selecting the interactive elements from a plurality of interactive elements based on the user profiles.

11. The method as described in claim 8, wherein the determining the at least one user of the plurality of users is a sales lead includes comparing the stages in the pipeline for the plurality of users to a level depth threshold.

12. The method as described in claim 8, further comprising causing display of the responses received via the interactive elements in the pipeline, the stages arranged in an order in which the interactive elements are exposed on a user device to a user.

13. The method as described in claim 8, further comprising determining at least one of the interactive elements as having a discount amount based on the levels assigned to the plurality of users.

14. The method as described in claim 8, wherein the propagating includes funneling the indicators of the users so that an earlier stage in the pipeline indicates more of the users than a later stage in the pipeline.

15. One or more computer-readable storage media comprising instructions stored thereon that, responsive to execution by a computing device, causes the computing device to perform operations including:

providing content as part of a webinar for exposure on user devices to a plurality of users;

exposing interactive elements on the user devices to the plurality of users as part of the webinar;

receiving responses to the interactive elements from the user devices;

assigning levels to the plurality of users based on the responses received via the interactive elements;

propagating indicators of the users through a pipeline having stages corresponding to the levels assigned to the users;

causing display of the interactive elements in the pipeline; and determining at least one user of the plurality of users is a sales lead based on the levels assigned to the plurality of users.

16. The one or more computer-readable storage media as described in claim 15, wherein the operations include determining engagement scores for the plurality of users of the webinar, and selecting which users of the plurality of users are to be exposed to the interactive elements based on the engagement scores.

17. The one or more computer-readable storage media as described in claim 15, wherein the operations include obtaining user profiles for the plurality of users and selecting the interactive elements from a plurality of interactive elements based on the user profiles.

18. The one or more computer-readable storage media as described in claim 15, wherein the operations include determining the at least one user of the plurality of users is the sales lead by comparing the stages in the pipeline for the plurality of users to a level depth threshold.

19. The one or more computer-readable storage media as described in claim 15, wherein the operations include causing display of the responses received via the interactive elements in the pipeline, the stages arranged in an order in which the interactive elements are exposed on a user device to a user.

20. The one or more computer-readable storage media as described in claim 15, wherein the operations include determining at least one of the interactive elements as having a discount amount based on the levels assigned to the plurality of users.

* * * * *